United States Patent [19]

Schumann

[11] Patent Number: 4,999,791

[45] Date of Patent: Mar. 12, 1991

[54] COMPUTER GRAPHICS COLOR FILM RECORDING METHOD AND APPARATUS

[76] Inventor: Robert W. Schumann, 3038 Irvington Way, Madison, Wis. 53713

[21] Appl. No.: 291,439

[22] Filed: Dec. 23, 1988

[51] Int. Cl.⁵ .................. H04N 1/46; H04N 1/23; H01J 29/32
[52] U.S. Cl. ......................... 364/525; 358/75; 358/296
[58] Field of Search ............ 364/525, 526, 518, 523; 356/402, 404; 358/75, 296; 313/467; 340/702, 703

[56] References Cited

U.S. PATENT DOCUMENTS

| | | | |
|---|---|---|---|
| 2,600,868 | 6/1952 | Hales | 358/302 |
| 2,612,553 | 9/1952 | Homrighous | 358/302 |
| 3,041,390 | 6/1962 | Horsley | 358/302 |
| 3,193,838 | 7/1965 | Mitchell, Jr. | 358/302 |
| 3,345,458 | 10/1967 | Cole et al. | 178/18 |
| 3,564,128 | 2/1971 | Hosterman | 178/19 |
| 3,591,268 | 7/1971 | Neale | 358/302 |
| 3,693,178 | 9/1972 | Braun et al. | 346/105 |
| 3,747,087 | 7/1973 | Harrison, III et al. | 340/702 |
| 3,752,906 | 8/1973 | Lowry | 346/105 |
| 3,774,169 | 11/1973 | Smith | 340/702 |
| 3,781,785 | 12/1973 | Balch | 340/703 |
| 3,795,761 | 3/1974 | Metzger | 346/105 |
| 3,997,720 | 12/1976 | Ikeda et al. | 358/296 |
| 4,003,058 | 1/1977 | Entwistle | 358/296 |
| 4,009,489 | 2/1977 | Seer, Jr. | 340/703 |
| 4,017,891 | 4/1977 | Helmberger et al. | 358/302 |
| 4,112,459 | 9/1978 | Gantier et al. | 340/703 |
| 4,201,223 | 5/1980 | Barney | 340/703 |
| 4,208,891 | 6/1980 | Ameen et al. | 358/302 |
| 4,240,729 | 12/1980 | Barney | 354/76 |
| 4,309,720 | 1/1982 | Denham | 358/75 |
| 4,343,542 | 8/1982 | Jonker et al. | 346/105 |
| 4,373,156 | 2/1983 | Pfannkuch et al. | 340/703 |
| 4,459,512 | 7/1984 | Ohhata | 346/105 |
| 4,467,325 | 8/1984 | Lustig | 340/703 |
| 4,467,369 | 8/1984 | Alston | 346/105 |
| 4,473,849 | 9/1984 | Cool | 346/105 |
| 4,481,530 | 11/1984 | Wagensonner et al. | 354/76 |
| 4,481,542 | 11/1984 | Goldberg | 346/105 |
| 4,500,182 | 2/1985 | Schumann | 354/4 |
| 4,536,848 | 8/1985 | D'Entremont et al. | 364/525 |

(List continued on next page.)

Primary Examiner—Parshotam S. Lall
Assistant Examiner—Ellis B. Ramirez
Attorney, Agent, or Firm—Foley & Lardner

[57] ABSTRACT

A colorgraphics recorder has a cathode ray tube with three parallel strips of light emitting phosphor, each emitting in one of the primary colors, with the light emitted from the phosphors focused on a film frame held in a film carrier. Each of the parallel strips of phosphor on the CRT can have a number of individually illumable pixels, forming a column of pixels. The light from each pixel at the same row level in each of the three strips of phosphor may be focused onto the same spot on the film frame so that all three of the primary colors are exposed at the same time at each pixel in the column of pixels exposed on the film frame. The film frame may then be indexed over one pixel width and the process repeated to expose another column of pixels in each of the three primary colors. Continued repetition of the process across the entire width of the film frame completes the exposure of the frame. Alternatively, the pixels on each of the three strips of phosphor on the CRT may be focused separately onto the film frame, forming three separate columns on pixels exposed in the three different primary colors. The intensity of the pixels exposed for each of the three colors is appropriate for the particular position on the film frame of the column of pixels that is exposed. The film frame is then indexed over one pixel width and the process repeated, with the tracing of the pixels on the CRT selected such that, for example, a column of blue pixels previously exposed on the film frame has a subsequent exposure by a column of green pixels, and another subsequent exposure by a column of red pixels, so that all of the three primary colors for all of the pixels in that column are exposed. This process is repeated, indexing the film frame one pixel width at a time until the entire frame of film is exposed.

28 Claims, 10 Drawing Sheets

U.S. PATENT DOCUMENTS

| | | | |
|---|---|---|---|
| 4,571,604 | 2/1986 | Schiebel | 346/105 |
| 4,582,396 | 4/1986 | Bos et al. | 340/702 |
| 4,627,004 | 12/1986 | Cool et al. | 358/302 |
| 4,660,098 | 4/1987 | Wolcott | 358/302 |
| 4,670,778 | 6/1987 | Miyakawa | 358/302 |
| 4,685,000 | 8/1987 | Barrett | 358/302 |
| 4,688,104 | 8/1987 | Wolcott | 358/302 |
| 4,695,902 | 9/1987 | Wolcott | 358/302 |
| 4,726,675 | 2/1988 | Shiota et al. | 358/302 |
| 4,734,761 | 3/1988 | Kondoh et al. | 358/78 |
| 4,742,397 | 5/1988 | Feria et al. | 358/302 |
| 4,746,934 | 5/1988 | Schoening | 358/75 |
| 4,752,823 | 6/1988 | Takahashi et al. | 358/244 |
| 4,757,334 | 7/1988 | Volent | 358/302 |
| 4,769,715 | 9/1988 | Feldman et al. | 358/302 |
| 4,780,756 | 10/1988 | Shiota et al. | 358/302 |
| 4,794,460 | 12/1988 | Shiota | 358/296 |
| 4,796,036 | 1/1989 | Misono et al. | 358/296 |
| 4,855,940 | 8/1989 | Richardson et al. | 364/525 |

COMPUTER GRAPHICS COLOR FILM RECORDING METHOD AND APPARATUS

FIELD OF THE INVENTION

This invention pertains generally to the field of photo-reproduction and particularly to equipment for generating photocopies of computer generated graphics.

BACKGROUND OF THE INVENTION

Various devices are used to obtain hard copy readout of graphic information produced by computers. If the graphics (pictures) are in color, a popular device for obtaining the hard copy is a colorgraphics film recorder, which in its simplest form is merely an ordinary camera used to photograph the cathode ray tube (CRT) screen of a computer monitor. This is often inadequate because monitor CRTs have limited resolution and usually have a limited ability to show a wide range of colors.

Colorgraphics film recorders of more sophisticated design utilize a high resolution CRT within a recorder cabinet and a camera which photographs the display on the CRT. Since the generation of the graphics display on the screen may be done more leisurely than when displays are to be viewed directly, the color fidelity and the range of colors produced by these internal CRTs can be greater than that provided by monitor CRTs. The improved resolution is achieved by utilizing monochrome CRTs in combination with color filters. Monochrome CRTs are less expensive and have substantially higher resolution. The graphics computer provides numerical information to the recorder indicating the amounts of red, green, and blue to be displayed for each of a million or more dots or pixels comprising the picture. The recorder displays the red, green, and blue components of the complete pictures on the CRT screen in sequence by interposing red, green, and blue filters between the CRT and the color film on which the picture is being recorded. In this manner, full color photographs are obtained from a CRT that provides white light.

The manner of displaying the picture on the screen employed by colorgraphics film recorders is relatively slow and, because of the way the image is formed, does not have the maximum possible resolution. The picture display is produced as a sequence of vertical columns of pixels or of horizontal rows of pixels. Typically, one column of pixels is energized on the screen, a pixel at a time, with the brightness of each controlled according to a sequence of data bits provided by the external graphics computer. The column of pixels at the left-hand side of the screen is illuminated first. This may be done while, for example, a blue filter is interposed in front of the camera lens. A first sequence of data bits represents the amount of blue color to be imaged in the first column of the photograph. Then the same column position on the screen is again addressed, pixel by pixel, while a green filter is interposed in front of the lens, with the brightness of each pixel controlled according to a second series of data bits representing the amount of green light to be imaged on each individual pixel. The same column on the screen is then again addressed while a red filter is interposed in front of the lens, this time with the brightness of each pixel in the column controlled in accordance with a third series of data bits received from the computer, representing the amount of red light to be imaged for each pixel in the columns. Following this, the CRT beam is horizontally deflected one column, and the process is repeated, with the intensity or duration of illumination of each pixel dependent on the magnitude of a continuing stream of bits representing the intensity of each color needed for each pixel in the second column. The process continues in this way until the complete picture has been illuminated in three colors and the photographic film is completely exposed. In these conventional graphic recorders, the horizontal position of each column of pixels on the film is determined by the horizontal deflection of the CRT beam, which is indexed horizontally one pixel width following each exposure of a picture column in the three colors.

Typically a color wheel composed of three pie slice shaped filters is used which is rotated at a constant speed. The speed is slow enough that in the worst case (when all pixels in a column need full illumination) the exposure can be completed before the filter color changes. No overall time savings can be realized by speeding up the exposure of individual pixels because the filter is spinning at a constant speed. Picture regions needing little or no exposure will take the same length of time to illuminate as regions needing full exposure because it is necessary to wait until the next filter color is in place before proceeding with the exposure of the next color.

Resolution is limited in these conventional systems because the column on the CRT face having the least number of pixels limits the number of pixels per column, since each column must have the same number of pixels. Thus, the number of pixels in each column is equal to the number of pixels in the columns near the edge of the CRT. This number is substantially smaller than the number of pixels in a column near the center of a round CRT screen, which is the type typically used. On a picture having a length to width aspect ratio of 5:4, the number of pixels near the edge is 66% of the number of pixels in the center column. Thus the resolution of the image is reduced from what could be obtained if all of the pixels at the center of the screen were available.

Large non-linearities in the vertical displacement of pixels occurs when the CRT beam must undergo a large horizontal deflection. Thus, in the regions near the edge of the CRT, the vertical displacement must be corrected to prevent inaccuracies in pixel positioning. However, due to the non-linearities, it is often difficult to provide precise correction, particularly if the correction is based solely on a calculated (not measured) value.

SUMMARY OF THE INVENTION

In the present invention, at least one line of light, composed of individually illuminated pixels, is formed on the face of a light emitter, such as a CRT, utilizing the entire face width or height of the CRT, and focused onto a frame of film to be exposed. A controller controls the deflection and beam intensity of the CRT for the one line being generated to create the desired exposure of the line onto the film at the particular position at which the line of light is focused. After an exposure of the line is completed, the next line of the image is drawn on the CRT and focused on the film a position one pixel width away from the line previously exposed line. For example, the film may be progressively indexed past the position in space at which the line of light is focused to build up the entire photographic image across the exposed film.

The line of light generated by the CRT can be of a single color (preferably a primary or quasi-primary color), with lines of light of each of a plurality of such primary colors (generally three colors) being sequentially or simultaneously focused at the same position on the film frame to expose a line on a color film which will be the composite of the several lines of color. Sequential imaging of the several colors can be done by having, for example, three strips of phosphor which emit the three primary colors form adjacent to one another across the height of the CRT, which are illuminated sequentially but focused on the same line on the film. An alternative preferred embodiment focuses the three separate color lines at the same position on the film frame by combining light from the three strips of phosphor with beam splitters mounted adjacent to the front face of the CRT. A conventional wide spectrum phosphor CRT may also be used by mounting color filter strips to the face of the CRT, with lines of color being produced by activating the phosphor under each filter strip in sequence.

In traditional graphic recorders, the picture to be photographed appears on the CRT screen as a raster scanned rectangular array of pixels—for example, a thousand columns each consisting of a thousand pixels per column. The picture is usually generated in the same manner as a screen is drawn on a television receiver of the type which uses a color filter wheel, except that the graphic film recorders usually generate the picture slowly and not repetitively, so that a human observer would not "see" a complete picture. If the CRT has a round screen, the picture must necessarily be inscribed within the circular screen.

In the present invention, the picture is not produced as a large number of side by side columns of pixels, but rather the CRT displays three columns of pixels side by side, with the beam falling upon three vertical strips of phosphors in sequence—one red light emitting, one blue light emitting, and one green light emitting—to form three columns of pixels. In a preferred embodiment, optical beam splitters are utilized to cause the images of the three columns of pixels to be focused, superimposed, on the film, despite the fact that the columns are separated horizontally on the screen. After one line of pixels in the three colors has been exposed on the color film, the film may be indexed in the horizontal direction a distance equivalent to the desired spacing between picture columns. The sequence repeats until all of the picture columns have been imaged.

In a second preferred embodiment, the three horizontally separated columns of pixels displayed on the CRT screen are imaged as three separate columns on the film. The complete exposure of the film is accomplished by exposing a number of consecutive picture columns on the film in one color, before beginning to expose consecutive picture columns in the second color, the film indexing having by then moved the film to a position such that the images of the second color fall onto the correct column position of the film. Following a number of further exposures of the film in the first two colors, the film indexing has proceeded far enough that exposures in the third color can commence. The controller receives the exposure information in the same sequence as for the first embodiment, and records in a memory, temporarily, the information received pertaining to the desired exposures in the second and third colors, and supplies that information to the exposure control circuitry as needed, when the film has been indexed sufficiently that exposures in the second, and then the third, colors can occur at the proper column positions of the complete picture.

In a third preferred embodiment, the external computer is programmed in such a manner that the exposures in the second and third colors proceed after delays such that the film indexing has moved the film sufficiently that the exposures in those colors fall upon the correct column positions of the film.

A major advantage of the present invention is that each column exposed on the film may contain more individually resolvable pixels than will a film exposed using conventional techniques with a conventional round CRT of the same dimensions and having the same pixel resolution. In the present invention, display columns may have a vertical height on the CRT screen equal to the diameter of the CRT screen, whereas in conventional recorders which draw an entire image frame onto a CRT face, forming a rectangular array of pixels, the vertical columns can have a length only a part of the screen diameter. For example, for a screen with a six inch diameter which draws a rectangular image having a 5:4 ratio of width to height, the columns can have a length of only four inches in conventional systems, and the width of the rectangle can be only five inches. However, in the present invention, the individual columns, since they preferably appear at approximately the horizontal center of the CRT screen, may have the full CRT screen width of six inches. Thus they may contain 66.7% more resolvable pixels than in a conventional CRT image, a significant improvement in resolution.

In the case in which the CRT used may have a rectangular rather than a ground screen, the same advantage in resolution may be achieved by rotating the deflection coils so that the lines of pixels displayed are parallel to a diagonal of the rectangular screen. In that case, a CRT having the rectangular dimensions of 4 units on one side and 5 units along the other side will have a diagonal length of 6 units. In that case, the diagonal length is longer by an an amount which provides for 66.7% more resolvable pixels to be produced for each picture column than for conventional colorgraphics recorders.

A further advantage is the elimination of the need to synchronize the display of a column of pixels with a spinning color filter wheel. The need for such synchronization in conventional systems slows the exposure process, because during changes in filter colors, no exposures can be made. Furthermore, in the present invention it is practical to increase the exposure of the film based on the length of time a pixel is drawn on the screen of the CRT rather than on the basis of the brightness of the pixels produced on the screen, as it is not necessary to complete the generation of one column of pixels within the time period during which a particular filter is in place. Thus, picture regions needing little exposure can be exposed rapidly while picture regions needing heavy exposures can be exposed over a longer period of time. The average picture region of a typical picture will need less than maximum exposure in every color, so that for a given CRT maximum beam current, the process of generating the exposure line in the present invention can usually be completed in less time than would be required to scan one line of a raster scanned picture image. Alternatively, for the same total picture generation time, lower beam currents can be used in the present invention than in prior systems while obtaining the same total exposure. Lower beam currents are desirable because they yield smaller spot diameters and hence greater resolution.

The preferred CRT face has three strips of phosphor, one blue emitting, one green emitting, and one red emitting. The beam is deflected vertically along each strip to produce the columns of pixels, with small horizontal deflections used to place the beam upon the desired strip of phosphor. In the first preferred embodiment, the beam splitter is positioned adjacent to the CRT face such that the images of the three separate columns of pixels on the screen merge and are superimposed. The three strips of phosphor on the CRT screen may be horizontally separated by distances equivalent to several pixel diameters, making manufacture of the CRT a relatively simple matter since extremely narrow strips of phosphor are not required.

In comparison with conventional color filter systems, the use of multi-color light emitting phosphors greatly increases the efficiency of light utilization. When a white light emitting phosphor is used in combination with color filters, each filter rejects all but a relatively small percentage of the total light emitted, resulting in the need for either a larger lens aperture to produce proper exposures in a given length of time, or a greater exposure time for a given lens aperture.

In the present invention it is also possible to use color filters to improve the color purity. The filters may be strips of filter material fastened to the CRT face plate over the strips of the corresponding color phosphors. If such filters are used, the light efficiency is not severely affected since, for example, a red filter will pass most of the light emitted by a red emitting phosphor, and only the relatively small amount of light of wavelengths outside the desired color band will be rejected.

As noted above, it is also possible to utilize a monochrome CRT with filter strips fastened to the face plate in positions corresponding to the phosphor strips. Equivalent color prints can be obtained, except that the light utilization efficiency is reduced from that obtainable utilizing strips of phosphors which emit three primary colors.

To achieve proper color balance, the recording apparatus of the invention may include means for adjusting the color balance separately for the three colors, preferably by use of a photosensitive detector and feedback circuits.

Because all CRT beam deflections are in the vertical direction, except for small horizontal deflections required to place the beam on the desired vertical phosphor strip, correction for nonlinearities of vertical deflections as a function of deflection coil currents can be easily obtained. Precise picture geometry can therefore be achieved without the complex correction means which are required when both large horizontal and vertical deflections are involved, as in conventional graphics film recorders.

Further objects, features and advantages of the present invention will be apparent from the following detailed description when taken in conjunction with the accompanying drawings.

DESCRIPTION OF THE PREFERRED EMBODIMENTS

Figure 1:
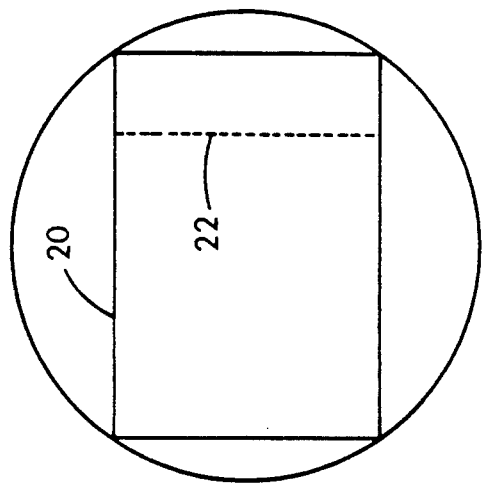
FIG. 1 is an example of a circular CRT screen and the rectangular area thereon within which graphics are displayed by conventional recorders.

For purposes of comparing the present invention with prior art computer graphics image generation and recording systems, a typical CRT face of a conventional image generation system is illustrated in FIG. 1. Within this, usually circular, face, the image field 20 is typically rectangular, requiring that the image be inscribed within the circular boundaries of the CRT face. Thus, a very substantial fraction of the CRT face is not utilized in generating the image. The image is typically formed of numerous parallel columns 22 (one shown) of picture elements (pixels) which are formed on the screen by tracking the CRT electron beam across the face of the tube in a raster scanned manner, analogous to the manner in which an image is generated on a conventional TV picture tube, but with the scan proceeding at a much slower rate.

Figure 3:
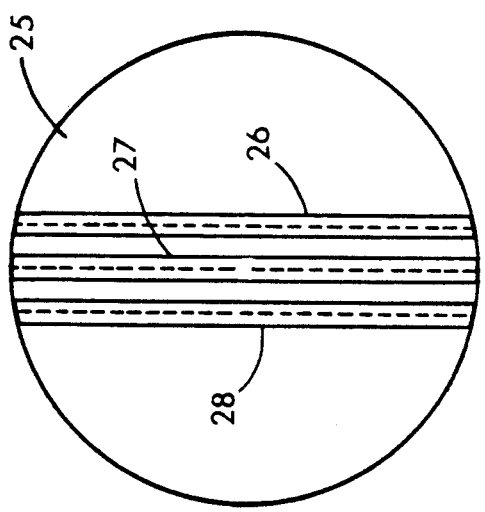
FIG. 3 is a view of a CRT screen in accordance with the invention having three phosphor strips and three illuminated columns of pixels thereon located near the center of the screen.
Figure 2:
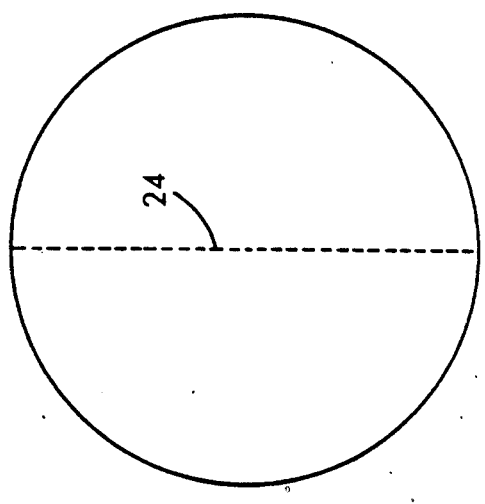
FIG. 2 is an illustrative view of a circular CRT screen with an illuminated column having the maximum number of pixels which can be resolved on such a screen in a single column.

FIG. 2 illustrates the manner in which a circular CRT face is utilized in the present invention, wherein a line of pixels 24 is illuminated which extends across the entire diameter of the circular CRT face. In this manner, a larger number of pixels can be resolved than in the conventional system of FIG. 1 utilizing the same size CRT face. For the same width to height ratio of the rectangular image to be formed on a film surface as for the rectangular image 20 of FIG. 1, the vertical column 24 can contain as much as 66.7% more pixels than the vertical column 22 of pixels in FIG. 1. It is understood that not all of the available pixels will be illuminated equally in the line 24.

In a preferred embodiment of the present invention, the CRT face 25 preferably has three strips 26, 27, and 28 of phosphor formed at or near the horizontal center of the CRT face. The phosphor strips are preferably separated by a small distance and are individually scanned by the electron beam of the CRT to illuminate the pixels of each strip in a proper fashion to generate a line of the image in the manner described further below. The three phosphor strips 26, 27, and 28 may emit, respectively, light in the primary colors of red, green and blue, combined in the manner described below to yield a line of pixels exposed on a frame of film which each have the desired hue and intensity. Alternatively, the strips 26, 27, and 28 may comprise strips of color filters which pass red, green and blue light and which are attached to the face of a monochrome CRT. In the latter case, the light intensity available from the CRT would be somewhat limited because of the loss of light in the portions of the spectrum blocked by each of the color filters.

Figure 4:
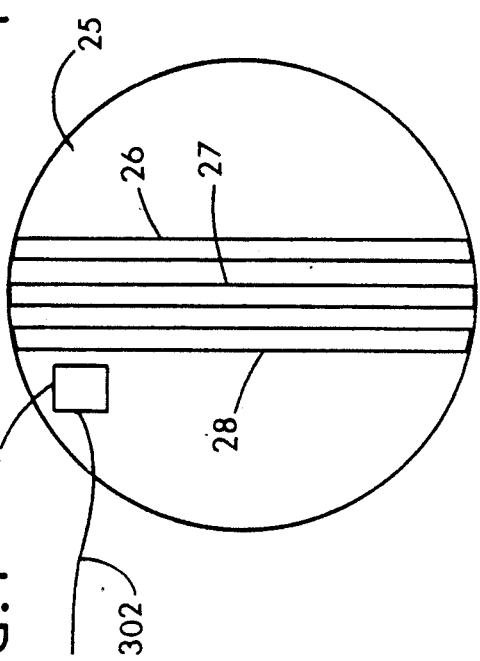
FIG. 4 is a view of a CRT screen, similar to that of FIG. 3, having a photodetector mounted thereon in a position to which the beam may be deflected to sense beam intensity.
Figure 5:
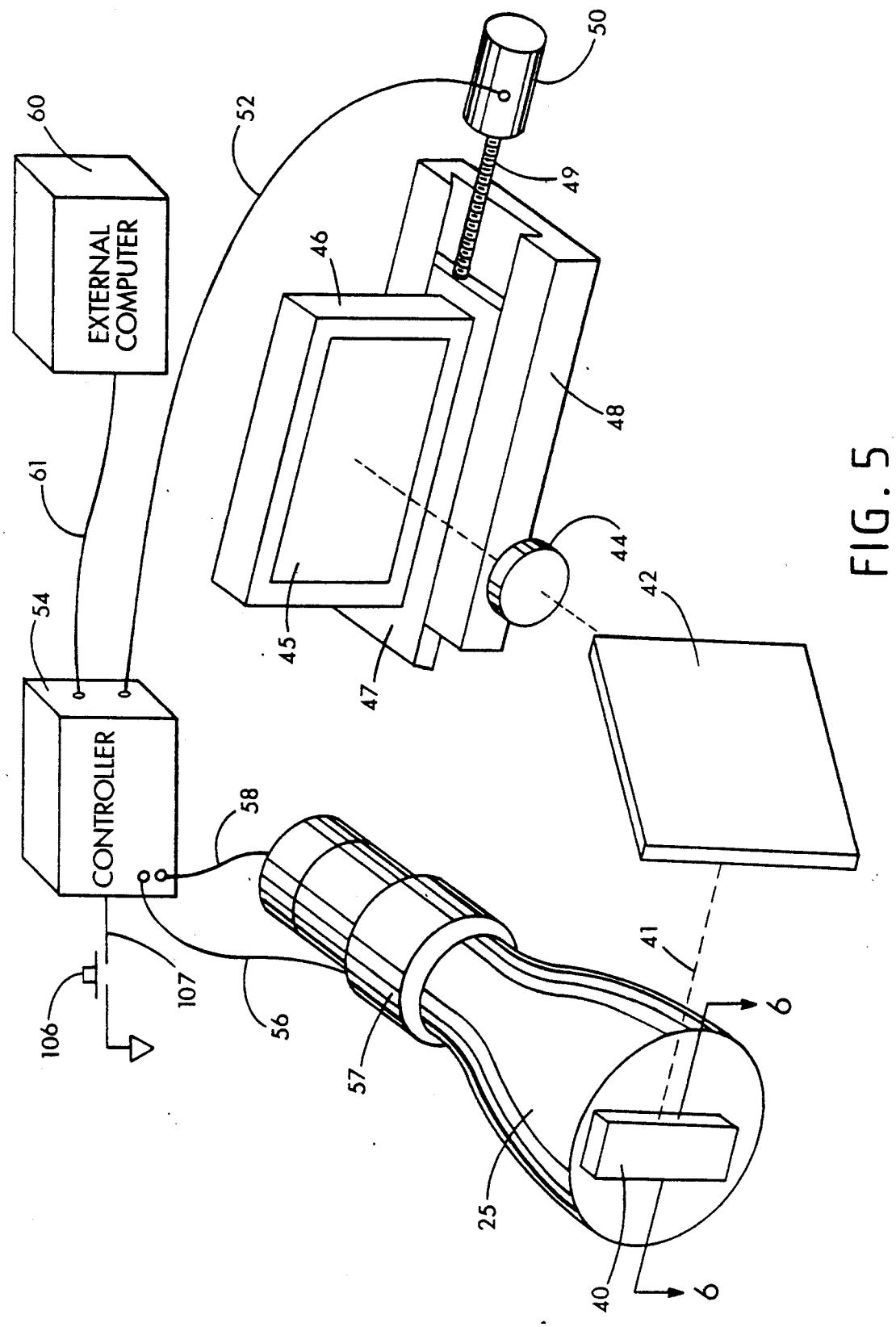
FIG. 5 is a simplified illustrative view of a preferred embodiment of the color film graphics recording apparatus of the invention.

A preferred embodiment for a graphics color film recorder apparatus in accordance with the present invention is shown generally in FIG. 5. The cathode ray tube (CRT) 25 may be a magnetic deflection CRT having the phosphor strips 26, 27, and 28 described above, with or without the color filter system shown in FIG. 4. A beam splitter 40, mounted to the front face of the CRT 25, combines the light from the three phosphor strips 26, 27 and 28 into a single beam which is directed along a light path 41 to a mirror 42. The mirror 42 reflects the light to and through a focusing lens 44 to a frame of photographic color film 45 mounted on a movable film carrier 46. The film carrier is mounted to a slide 47 which fits into the channel of a slide bearing 48 which holds the slide 47 so that it can be moved smoothly back and forth while restraining it from motion in any other direction. The slide 47 is driven back and forth by a drive screw 49 which is attached to and rotated by a stepping motor 50. The stepping motor receives control drive signals through a cable 52 from a controller 54.

The controller 54 also provides control currents via a cable 56 to the CRT deflection coils 57 mounted on the CRT 25 to deflect the electron beam vertically and horizontally in the manner described further below. The CRT has an electron beam current control grid which is controlled by control voltages supplied from the controller 54 on conducting lines 58. The control voltages which are supplied from the controller 54 to the CRT beam current control electrode serve to turn the electron beam on and off, as described further below, with the on and off control signals being generated by circuits within the controller 54.

An external computer 60 (e.g., a commercial micro or mini computer) is connected by a serial or parallel cable 61 to the controller 54 and provides data constituting the image generated by the computer 60.

Figure 6:
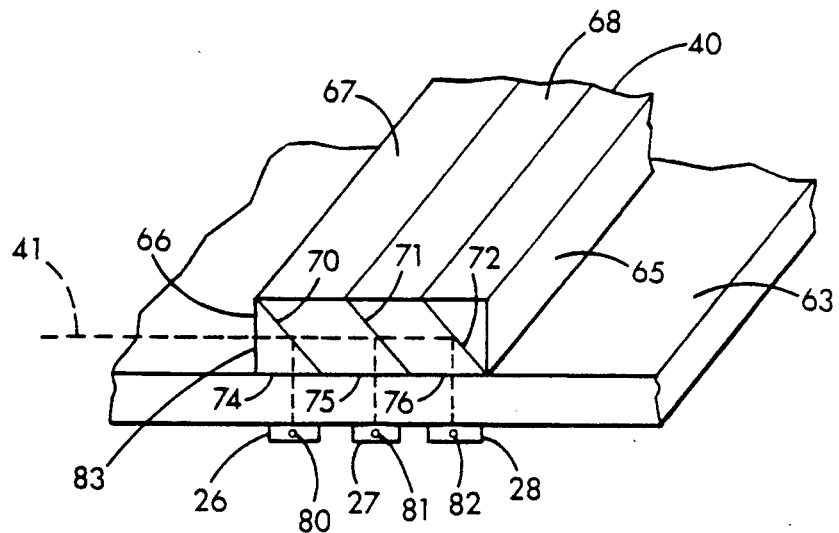
FIG. 6 is a partially cut away view of the CRT face of the apparatus of FIG. 5, showing the beam splitter mounted thereon.

A cross section through the face of the CRT 25 is shown in FIG. 6 to illustrate the mounting of the beam splitter 40 on the face plate 63 of the CRT. The beam splitter 40 is comprised of glass optical elements including right angle prisms 65 and 66 and parallelopipeds 67 and 68, with the elements abutting a 45° angle interface surfaces 70, 71, and 72. The interface surface 70 is preferably one third reflecting and two thirds transmissive. The surface 71 is 50% transmissive and 50% reflective. The interface surface 72 is totally reflective. Coating techniques for the surfaces of the glass elements to achieve these transmission and reflection characteristics are well known in the art. The beam splitter 40 is mounted to the glass face plate 63 at a position exactly lying over the phosphor strips 26, 27, and 28, which are formed on the inner surface of the glass face plate 63. The beam splitter is mounted so that the long dimensions of its original elements are parallel to the phosphor strips 26, 27, and 28 with the prism 66 lying over the phosphor strip 26, the parallelopiped 67 lying over the phosphor strip 27, and the parallelopiped 68 lying over the phosphor strip 28. The surface area 74 of the face plate 63 underlying the prism 66 may be coated with blue filter material, the surface area 75 underlying the parallelopiped 67 may be coated with green filter material, and the surface area 76 underlying the parallelopiped 68 may be coated with red filter material. In the preferred embodiment, these filters have the same light passing characteristics as the filters utilized in conventional color-filter wheel graphics recorders. Use of these filtering materials is unnecessary if the light from the three phosphors has satisfactory spectral content. Filters such as Kodak type 25, 47B and 55 are satisfactory.

Light that is emitted in a direction perpendicular to the surface 74 from an illuminated spot 80 on the red phosphor strip 26 is one third reflected by the surface 70 along the light path 41. The remaining two thirds of that light is transmitted upwards and is absorbed by the surface coating 78. Light transmitted perpendicularly to the surface 75 from an illuminated spot 81 on the phosphor strip 27 is 50% reflected by the surface 71 to the path 41. Since the surface 70 is two thirds transmissive, two thirds of green light reflected from the surface 71 is transmitted through the surface 70 and continues along the path 41. The amount of green light exiting from the exit surface 83 of the beam splitter 40 along the path 41 is therefore one third of that which was emitted perpendicularly from the illuminated spot 81 on the green phosphor. Light from an illumiated spot 82 on the blue phosphor 28 is totally reflected to the left along the path 41 and half of it is transmitted through the interface surface 71 and two thirds of that is transmitted through the interface surface 70. Therefore, one third of the light emitted from the phosphor 28 exits from the surface 83 along the path 41. Thus, essentially equal percentages of the light emitted from the three phosphors is transmitted along the path 41 to the mirror 42. It is, however, not critical that the foregoing percentages of reflectivity and transmissivity be utilized for the surfaces 70 and 71. The proportions used in the preferred embodiment result in equal percentages of light surviving to travel along the path 41. However, other ratios of transmissivity to reflectivity will result in other proportions of surviving light for each of the three colors, which in some cases can be desirable. For example, if the efficiency of the three phosphors is different, it may be preferable that larger amounts of light survive for the case of a less efficient phosphor than for the more efficient. The balancing of light intensities can be accounted for by the adjustment of the electron beam current which reaches the phosphor for each of the three phosphor strips 26, 27, and 28.

Preferably, the beam splitter 40 has a length at least equal to the length of each of the phosphor strips so that all the light from the strips is transmitted. For proper superposition of the images from each of the three phosphors, the interface surfaces 70, 71, and 72 are preferably oriented at 45° with respect to the plane of the inner surface of the CRT face plate, and the illuminated columns of pixels energized on the phosphors by the impinging electron beam of the CRT, when generating light from the three different phosphors, should be separated by distances accurately equal to the widths of the surfaces 75 and 76 of the parallelopipeds 67 and 68.

It will be noted that the total path length of the light emitted from the phosphor 28 to the exit surface 83 is longer than the path of light from the phosphor 27, which in turn is longer than the path of light from the phosphor 26. This path length difference can be minimized by minimizing the lengths of the sides 75 and 76 of the parallelopipeds 67 and 68. In the extreme, these lengths may be as short as two or three pixel diameters, which causes the path length differences to be negligible as far as image focusing is concerned. In some cases the path length differences can actually be advantageous, particularly for cases in which the focal length of the focusing lens is longer for one color of light than for others. The additional light path length may be adjusted by proper selection of the widths of the parallelopipeds and corresponding adjustments of the separations between the vertical columns of pixels generated on each of the three phosphors. In this manner it is possible to achieve more precise focusing of the images of the displayed pixels, thereby improving resolution of the image formed on the photographic film.

The operation of the apparatus of the invention can be understood with respect to the simplified view of the apparatus of FIG. 5, it being understood that the apparatus shown therein would ordinarily be within an enclosure to keep out ambient light. The frame of film 45 is initially positioned by the carrier 46 so that the light from the columns of pixels to be illuminated on the CRT screen will fall at the left margin of the film frame on the carriage. A vertical column of pixels is then illuminated, pixel by pixel, on the blue light-emitting phosphor, each pixel being illuminated for a length of time corresponding to the magnitude of the corresponding data byte received from the computer 60. There may be, for example, three thousand pixels per column, and beginning with the first data byte received, a column of blue pixels is generated on the CRT screen until all the blue pixels have been exposed. The next three thousand data bytes received from the computer 60 may correspond to the amounts of green light desired for the first column of pixels. The CRT horizontal deflectiOn is changed so that the beam will be directed at the green phosphor strip, and a column of green pixels is generated on the screen. In a similar manner, the next three thousand data bytes received from the computer controls the amount of red light to be generated for the red pixels, with the CRT beam now directed at the red phosphor strip. Following illumination of the pixels on all three of the strips, the stepping motor 50 is then energized to step an amount corresponding to sufficient movement of the carriage 46 to achieve the separation desired between the columns of pixels on the photographic film 45. The process of illuminating three thousand blue pixels, green pixels and red pixels on the screen is repeated as described above for the first picture column, now using the second nine thousand data bytes received from the computer to control the length of time each pixel is illuminated for each of the three colors. The process is repeated many times and, eventually, all the columns of pixels (e.g., 4,000 columns) in the three colors are exposed on the film. When the process ends, the film may be removed from the carriage 46 for developing and further processing.

Figure 7:
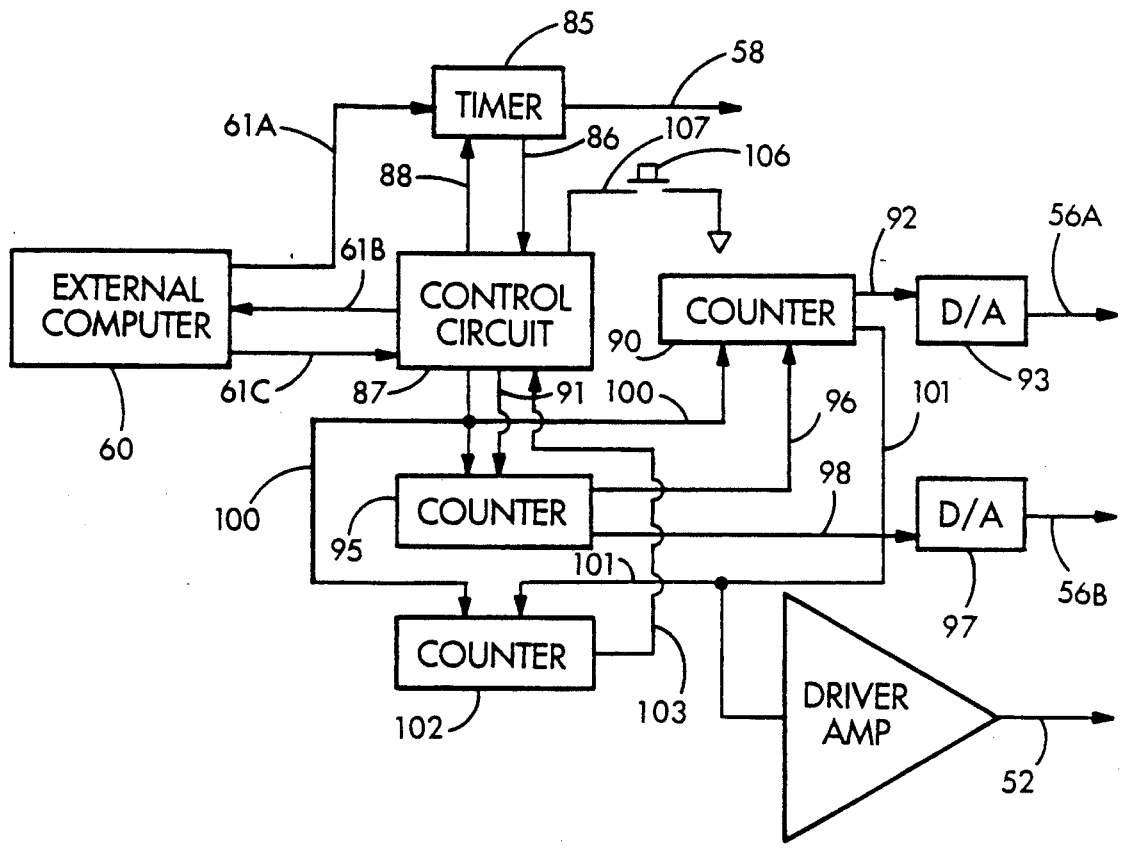
FIG. 7 is a schematic diagram of the controller for the apparatus of FIG. 5.

A preferred implementation for the controller 54 is shown in schematic form in FIG. 7. The conductors within the cable 61 between the computer 60 and the controller 54 are labeled 61a, 61b, and 61c in FIG. 7. Conductors 56a and 56b are conductors contained within the cable 56 shown in FIG. 5, with the connecting control lines 52 and 58 consisting of single conductors.

The functions of each of the major elements of FIG. 7 will first be described.

The process begins when the operator depresses the switch 106 which produces an output on line 107 to a control circuit 87, to be described subsequently.

The control circuit 87 receives a start signal received from the switch 106 via conductor 107, which activates that control circuit and causes it to produce an output signal on a line 100 to a counter 95, a counter 90 and a counter 102, causing their states to be set to state zero. The control circuit 87 at the same time supplies an output signal to the external computer 60 on a conductor 61b, indicating to the computer that the system is ready to receive a byte of exposure information transmitted from the computer to timer 85 via an 8-conductor cable 61a. The computer supplies an output signal on a conductor 61c at the time a valid data byte is actually present on the cable 61a, and the computer continues to provide that data byte until control circuit 87 provides another signal on a conductor 61b, at which time a new data byte is provided by the computer on a cable 61a, and another signal on the conductor 61c to indicate that that new data byte is valid.

A timer 85 produces a beam on/off signal on a line 58 to the control grid of the CRT 25, causing the beam to turn on at the time a data byte is received from the computer 60 via an eight conductor bus cable 61a, and to remain on for a length of time proportional to the magnitude of the data byte received. When the "beam on" interval has ended, the timer 85 transmits a signal on a line 86 to the control circuit 87. The timer 85 is caused to accept the information byte on the cable 61a by a signal on a line 88 from the control circuit 87. That signal is produced by the control circuitry 87 when it has received a signal from the computer 60, via the conductor 61b, that a valid data byte is present on the control cable 61a. Simultaneously, the control circuit causes a counter 95 to be increased by applying a control signal to a conductor 91 connected to that counter. The counter 95 is a scale of 3,000 counter having states 0 through 2,999. When incremented, its state increases by 1, except if it was in state 2,999 and incremented, in which case it assumes state 0. Its output, a 12-bit binary number, is transmitted via a cable 98 to a D to A converter 97. The D to A converter 97 provides its output on the line 56b to control the current in the vertical deflection coil of the deflection yoke 57 shown in FIG. 5. The deflection caused by the coil in the yoke 57 is controlled such that when the counter is in state 0, the beam is directed at the bottom of the phosphor strips; when in state 1,999, the beam is directed to the top of the phosphors strips. For other states the beam is directed proportionately upwards from the bottom an amount proportional to the existing state.

When the counter 95 has reached state 2,999, the next incrementing signal causes its state to become zero, and counter 95 provides at that time an incrementing signal on a line 96 connected to the counter 90, causing that counter's state to be incremented. Counter 90 is a counter which has three states, 0, 1, and 2. When incremented its state increases by 1, except if it is in state 2 and incremented, in which case it assumes state 0. Its output, a two bit binary number, is transmitted via a cable 92 to a digital to analog converter 93. The D to A converter 93 provides its output signal on the line 56a to control the current in the horizontal deflection coil of the deflection yoke 57 shown in FIG. 5. The deflection caused by the coil in the yoke 57 is controlled such that when the counter is in state 0, the beam is directed at the blue phosphor strip, when in state 1, the beam is directed at the green phosphor strip, and when in state 2, the beam is directed to the red phosphor strip.

Thus, in response to data bytes from the computer, the pixels of the first picture column will sequentially be exposed in blue light until all 3,000 pixels have thus been exposed, after which control circuit 87 produces an incrementing pulse on conductor 91, causing the state of the counter 95 to be incremented from state 2,999 to state zero. This causes an incrementing signal to occur which is conducted to counter 90 via conductor 96, incrementing counter 90 to state 1.

The process continues, with exposures in green light occurring, if the incoming data bytes call for non-zero exposures, until counter 95 has been incremented through its 2,999th state, to zero, which produces a further incrementing signal on conductor 96 to counter 90, changing its state to state 2, and thereby directing the CRT beam towards the red phosphor strip.

Again, the process continues, with exposures in red light occurring if the incoming data bytes are non-zero, until counter 95 has been incremented through state 2,999 to state zero. The consequent incrementing signal from that counter to counter 90 via conductor 96 causes counter 90 to be incremented to state zero, thereby causing an incrementing signal to occur on conductor 101, which causes counter 102 to be incremented to state 1.

That process of exposing a picture column in blue, green and red light, if the incoming data bytes are non-zero, continues until the column counter 102 has reached state 3,999 and is again incremented, at which time a signal is conducted via the conductor 103 from the counter 102 to the control circuit 87, causing the entire process to end. The process proceeds from its beginning, in the same manner, whether or not the incoming data bytes call for zero exposures, but no actual exposures occur if the data byte has a value equal to zero.

The counter 95 may be designed to "overflow" to state zero, and to then produce an incrementing signal on conductor 96 to counter 90, after any desired number of incrementing signals. The number 3,000 selected for this embodiment is convenient, because for a complete picture size of 3"×4", the pixels will be separated by 0.001". There are a number of well known ways in which the human operator can, by means of switches, cause that counter to "overflow" after reaching any other desired state.

Similarly, the counter 102 may be designed to "overflow" after any desired number of increments, the number 4,000 being selected for one preferred embodiment, but the number 4,008 being selected for another preferred embodiment. The "overflow" state need not be selectable by the human operator, in the case of either counter 95 or 102, but instead "built in" at the time of manufacture of the graphics camera.

The design of counters such as 95, 90 or 102, which produce output signals when incremented at the time the counters have reached a predetermined state such as 2,999, 2, 3,999 or 4,007 is well known by those skilled in counter design.

Figure 8:
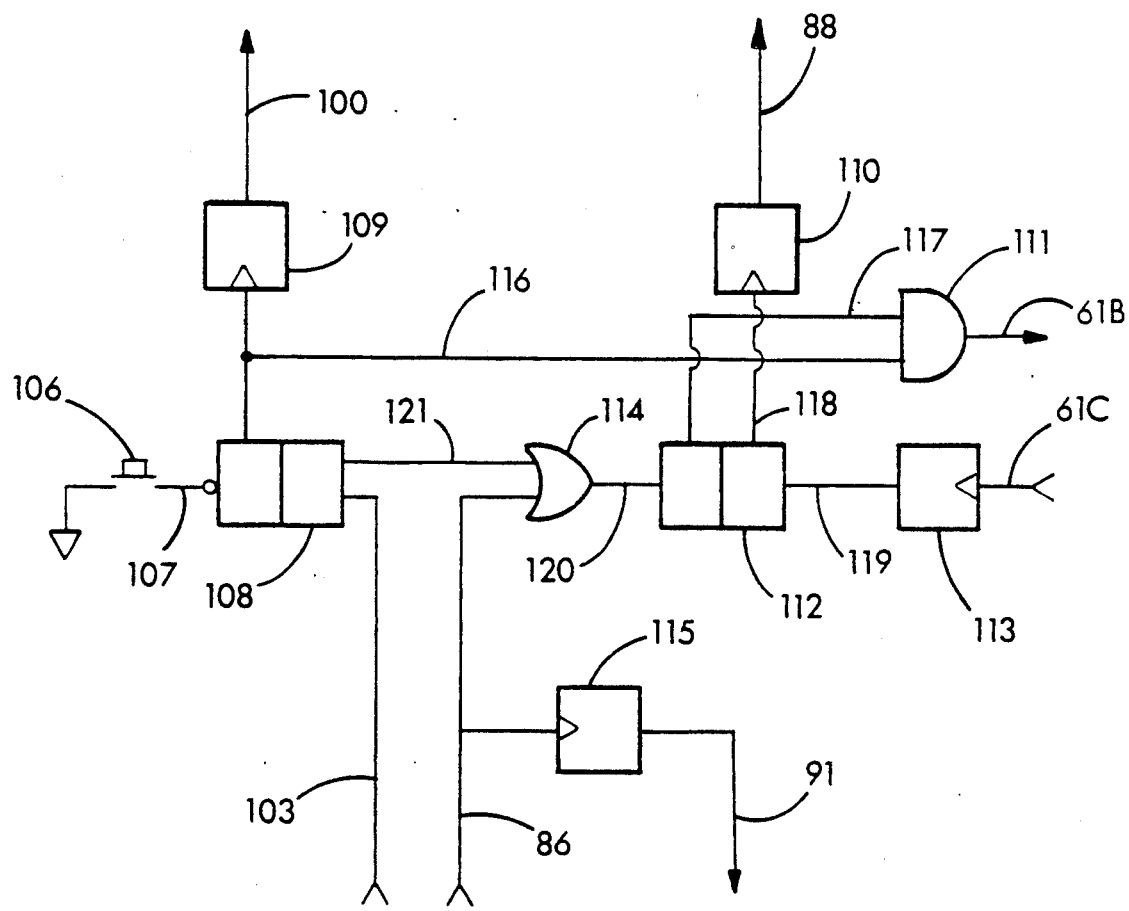
FIG. 8 is a schematic diagram in more detail of a portion of the controller of FIG. 7.

The control circuit 87 is depicted in more detail in FIG. 8. The nature of each of the elements will first be described.

"One-shot" multivibrators 109, 110, 113 and 115 produce a brief pulse at their outputs when they receive a signal at their inputs which changes from a "zero" state (near ground potential) to a "1" state, a positive voltage.

The flip-flop 108 is an RS flip-flop which has an output signal conducted via a conductor 116, that output being positive when a zero voltage signal is applied to one input via conductor 107, with that output remaining positive until a positive signal occurs at its other input received via conductor 103.

The flip-flop 112 is an RS type flip-flop, with a set signal, and a reset signal, and two outputs. The output signal transmitted to the conductor 118 is always the complement of the output signal transmitted to the conductor 117. The conductor 117 receives a positive output signal from the flip-flop after a positive voltage is applied to its set input via a conductor 120. That output becomes zero voltage when a resetting input signal, a positive voltage, is transmitted to the flip-flop via conductor 119.

The operation of the control circuit 87 is as follows. Initially, flip-flop 108 may be assumed to be such that its output is zero, that output being conducted via conductor 116 to an input of AND gate 111, and to the input to multivibrator 109. Latch type flip-flop 102 is initially in the "off" state, since the complementary output of flip-flop 108, conducted via conductor 121 to OR gate 120 causes that OR gate to produce a positive output to flip-flop 112 via conductor 120, thereby causing that flip-flop to be in the "off" state wherein its output conductor 117 is zero, and its output on conductor 118 is positive.

When the operator depresses switch 106 (which corresponds to switch 106 of FIG. 7) flip-flop 108 is set to the "on" state by the signal transmitted to its input via conductor 107. The flip-flop's output, transmitted to multivibrator 109, becomes positive, therefore causing that multivibrator to produce a output pulse on conductor 100, corresponding to conductor 100 of FIG. 7. The output of flip-flop 108 is also transmitted by conductor 116 to OR gate 114, and the resulting positive output of that OR gate is transmitted to flip-flop 112 via conductor 120, setting it to a state wherein the flip-flop's output on conductor 117 is positive. That positive output is conducted to AND gate 111. That gate receives a second positive signal input from flip-flop 108 via conductor 116, so the AND gate output becomes positive. That output on conductor 61b (corresponding to 61b of FIG. 7) as has been previously described is a signal which when positive indicates to the external computer 60 that the system is ready for a byte of exposure information.

When the computer has provided a valid data on cable 61a, the computer transmits to the control circuit 87 a "data ready" signal on conductor 61c to the multivibrator 113, that multivibrator then producing a brief positive output conducted to flip-flop 112 via conductor 119. The occurrence of that brief positive output signal causes that flip-flop to be reset, so that its output on the conductor 117 becomes zero, and the output on conductor 118 becomes positive.

The occurrence of that positive-going voltage from flip-flop 112, conducted to multivibrator 110, causes that multivibrator to produce a brief positive signal on its output, conducted via conductor 88 to timer 85 of FIG. 7, the timer, as explained previously, thereby being caused to accept a data byte from the external computer, and to begin its timing cycle which lasts for a time proportional to the magnitude of the data byte it has received.

Subsequently, that timer provides an "exposure complete" signal on conductor 86, which as shown in FIG. 7, is connected to the input of the multivibrator 115. That multivibrator produces a brief positive output signal, conducted via conductor 91, thereby causing counter 95 to be incremented as explained earlier. The "exposure complete" signal on conductor 86 is also conducted to an input of OR gate 114, which then produces a positive output on conductor 120, which sets the flip-flop 112 so that the output on conductor 117 becomes positive. This causes AND gate 111 to produce another positive signal, conducted to the external computer, indicating readiness for another byte of data.

This continues until an overflow signal from counter 102 of FIG. 7 is received by flip-flop 108 via conductor 103, that signal resetting flip-flop 108, ending the process.

Figure 13:
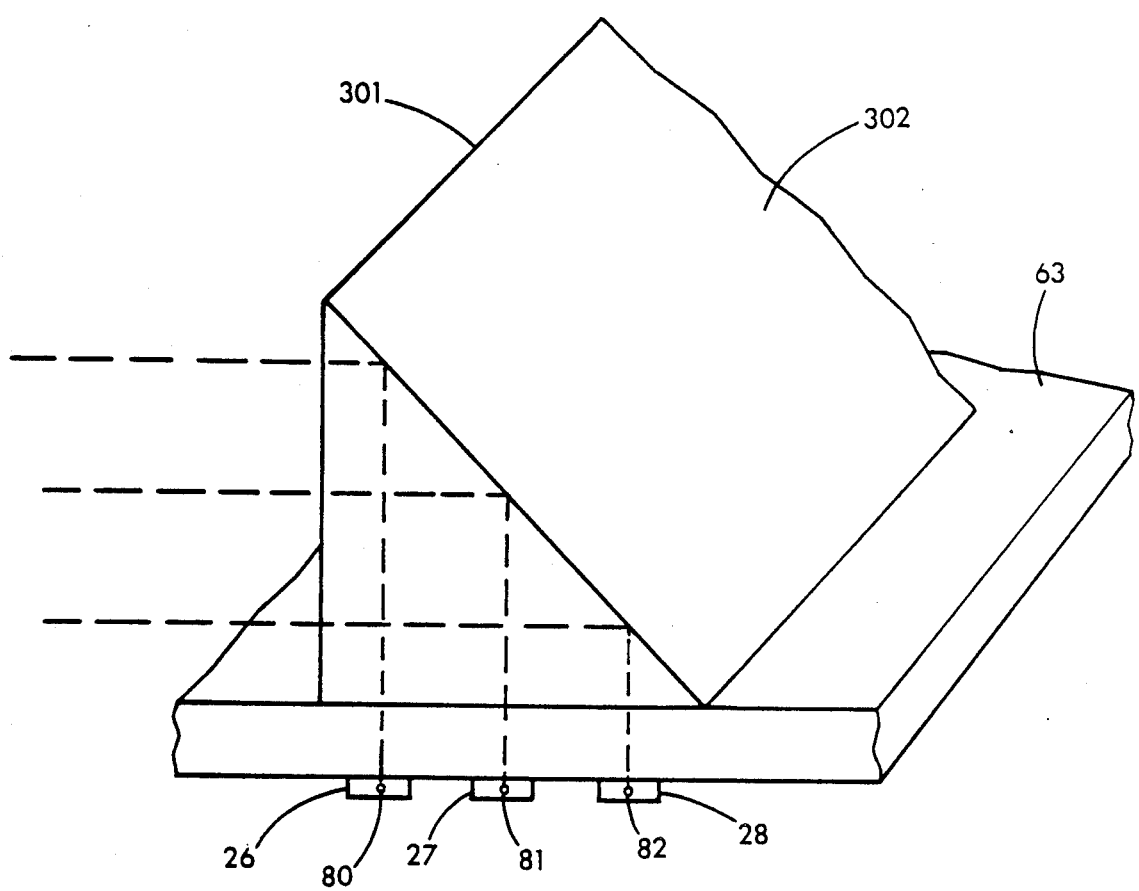
FIG. 13 is a partially cut away view of the face of a CRT which may be utilized with the invention, showing a prism mounted thereon.
Figure 19:
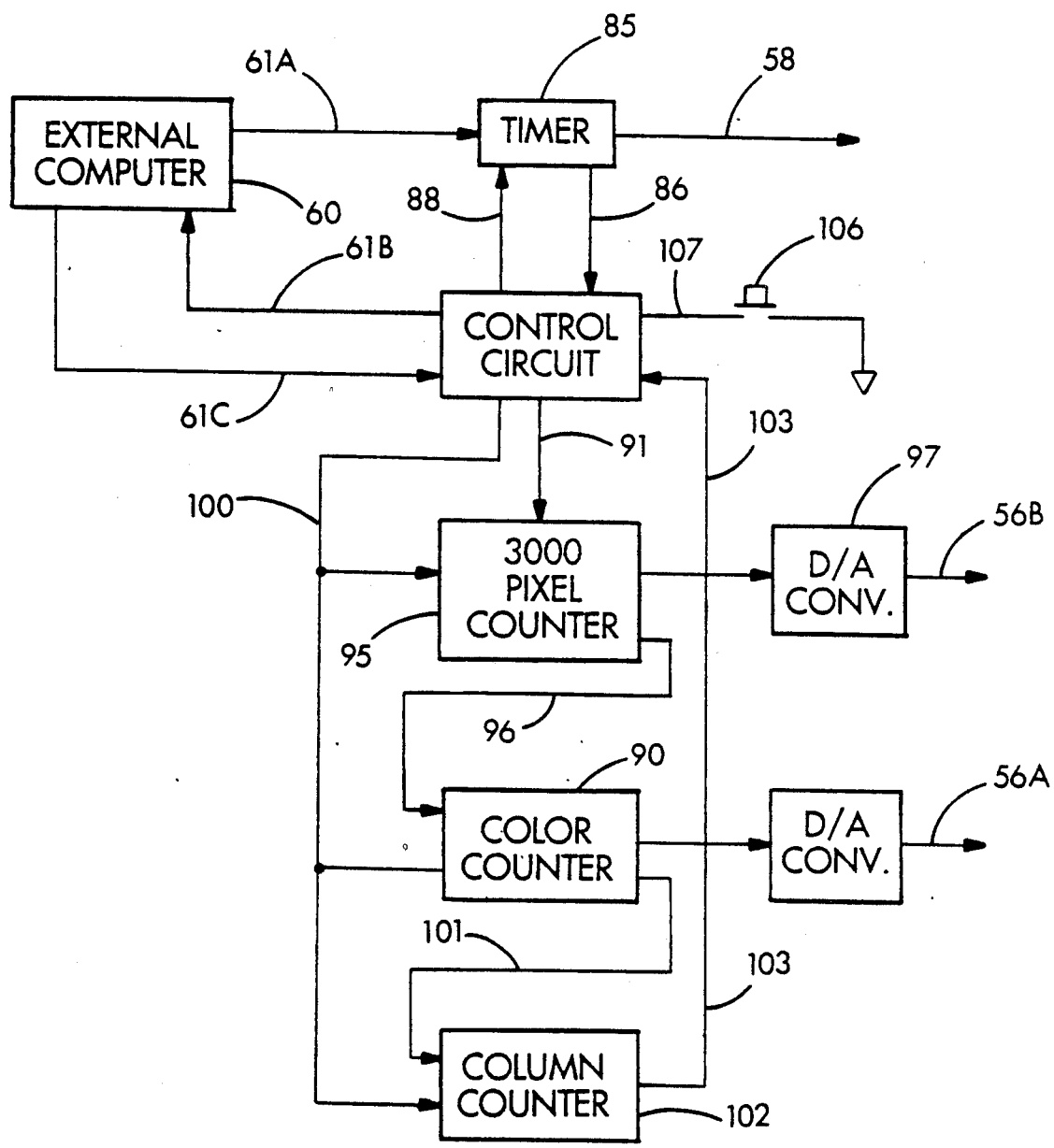
FIG. 19 is a schematic diagram of another controller for the apparatus of FIG. 10.

It is also possible to carry out the present invention without combining the blue, green and red images by use of the beam splitter of the preceding embodiment. The beam splitter may be replaced with a right angle prism 301, with a mirrored hypotenuse 302, as shown in FIG. 13, and the remainder of the apparatus may be the same, but the computer should be programmed to supply exposure information in a different sequence to a somewhat simplified control circuit as shown in FIG. 19.

Figure 9:
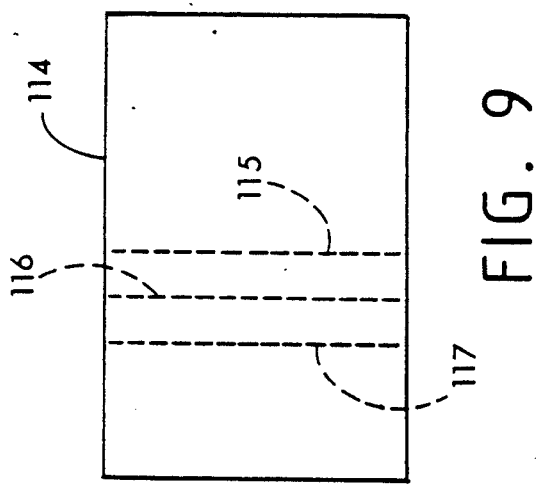
FIG. 9 is an illustrative view showing the exposure of three columns on a frame of film in another embodiment of apparatus in accordance with the invention.

Replacing the beam-splitter assembly with the prism causes the images of the blue, green and red columns of pixels to be offset horizontally, as shown in FIG. 9. This offset may be compensated for by delaying the transmission of green pixel exposure information and red pixel exposure information, so that the first column of green exposures will be made on the film at the first picture column position. The red pixel exposure information is further delayed so that the first red exposures will occur on the film at the first picture column position.

Assuming that the columns of pixels in the three colors separated by four pixel diameters (corresponding to the separation of adjacent picture columns on the finished picture), four columns of blue exposures should occur before the green exposures begin, and eight columns of blue exposures should have occurred before the red exposures begin. The amount of separation of columns is not critical; it might be eight, sixteen or more columns, but for purposes of illustration, it is assumed that the separations are by four columns.

During the processes involving the first four blue column exposures, the computer transmits "no-exposure" data bytes (zeroes) during the intervals in which green and red exposures would be made in the first preferred embodiment described above. After that, both blue and green picture exposure information is transmitted, but in place of the red exposure information, "no-exposure" data are transmitted by computer. This continues until eight columns of the picture have been exposed in blue, and four in green light. This continues until all 4,000 picture columns have been exposed in blue light. After that time, the computer transmits "no exposure" information rather than further blue exposure information, until all 4,000 columns have been exposed in green light. Thereafter, both blue and green exposure information bytes are replaced by zeroes, until the red exposures of the picture have been completed, and the process is then ended.

No change is required of the control circuits of FIGS. 7 and 8, except that counter 103 should not produce an overflow signal until it has reached state 4,008.

Figure 14:
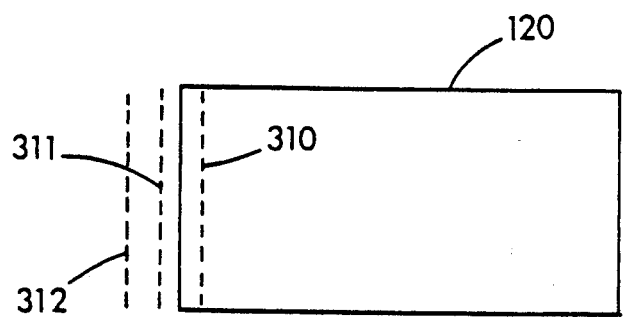
FIG. 14–18 are illustrative views of a film frame showing the manner in which pixels of the three primary colors can be sequentially exposed on the film.

FIGS. 14 through 18 illustrate the process. In FIG. 14, the film 45 receives light from the CRT screen, but the images of pixel columns in green and red light are as shown, falling to the left of the film. Blue image column 310 is shown positioned at the position desired for the first picture column. The green image column 311 is shown somewhat to the left of the film surface and the red image column 312 is shown further left.

FIGS. 14–18 illustratively depict the picture columns which have been exposed at various stages of the process, with the columns shown widely spaced to allow illustration. FIG. 14 shows the first picture image column, 310, that has been exposed in blue light only, after the fitst cycle of the operation, that cycle being the 9,000 step cycle in which the blue, green and red exposures would have been made in the case of the first preferred embodiment. In the present embodiment, only exposures in blue have occurred, the green and red exposures having been inhibited by the transmission of "no-exposure" information from the computer.

Figure 15:
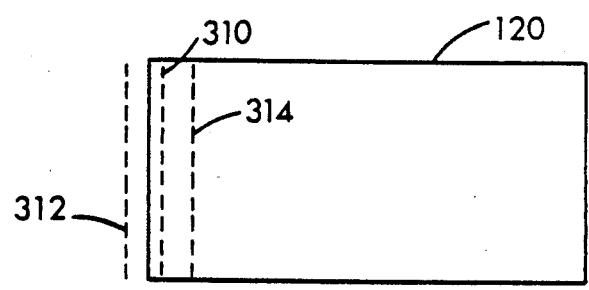

FIG. 15 indicates the picture exposures which have occurred after the second 9,000 step cycle; picture columns 310 and 314 have now been exposed in blue light, only.

Figure 16:
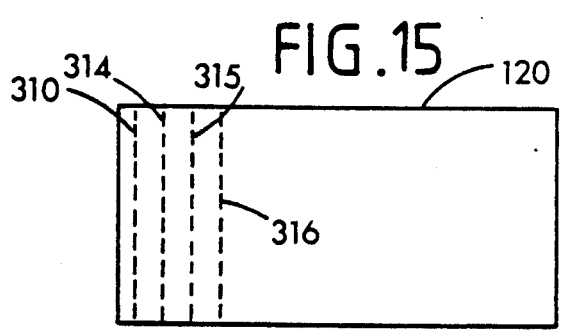

FIG. 16 indicates the four picture columns 310, 314, 315, and 316 which have been exposed after a total of four 9,000 step cycles have occurred. These picture columns have now been exposed only in blue light.

Figure 17:
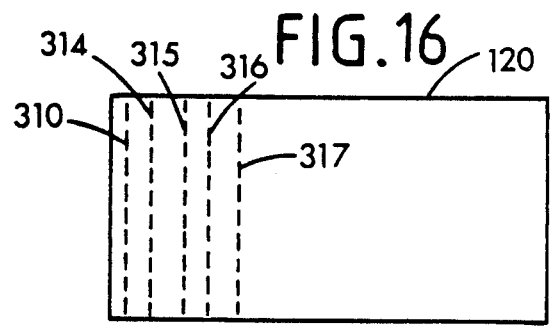

FIG. 17 indicates the picture columns 310, 314, 315, 316, and 317 after five 9,000 step cycles have occurred. Column 310 has now been exposed in both green and blue light, the others in blue light, only.

Figure 18:
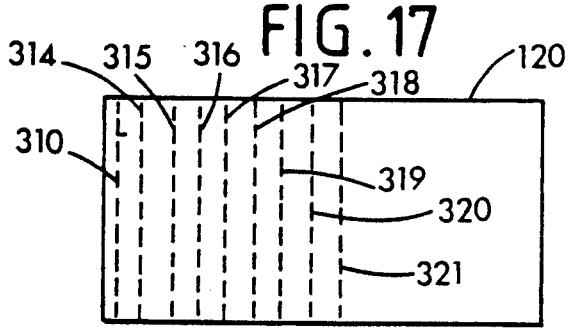

FIG. 18 indicates the picture columns 310 and 314 through 321, after nine 9,000 step cycles have occurred. Picture column 310 has been exposed in the three colors, columns 314 through 317 have been exposed in both green and blue light. Picture columns 318 through 321 have been exposed only in blue light.

The process continues, as indicated earlier, until all exposures have been made.

A representative computer program, written in the Pascal programming language, is listed below. It is assumed that the pixel exposure information has been recorded address sequentially, pixel by pixel, in three of the computer's separate memory locations (pages), one page for each color, memory address sequentially. The first address of each page corresponds to the exposure information for the picture's upper left pixel, and the last address of each page corresponds to the lower right pixel of the picture. The pixel numbering sequence begins at the upper left hand pixel, and continues down the first column to the bottom pixel of that column. It then proceeds column by column in that manner, to the lowest pixel of the 4,000th picture column. The computer may be, for example, an IBM PC/AT, utilizing the MS/DOS operating system.

A program written in Pascal which demonstrates the method by which a picture in memory is transferred to the camera is set forth below. The data is delayed by 8 columns for the red information, 4 columns for the green information, and transferred with no delay for the blue information. The picture to be sent resides in memory in an array which has dimensions of 4,000 horizontally, 3,000 vertically, and has 8 bits of information for each of the colors red, green, and blue.

The picture is loaded into memory before the transfer by the procedure Load_Picture, which is simply stubbed here, so an uninitilaized array is transferred. This code example is meant to demonstrate a means of delaying the data for two colors. In actual use the procedure Load Picture would load the Picture array from a file or create the picture by other means.

```
program serid;
const
    HORIZONTAL_RESOLUTION = 4000;
    VERTICAL_RESOLUTION = 3000;
    GREEN_DELAY = 4;
    RED_DELAY = 8;
    ZERO = 0;
type
    Colors = ( Blue, Green, Red );
    MemoryPicture
        = array[1..HORIZONTAL_RESOLUTION, 1..VERTICAL
RESOLUTION, Colors] of Byte;
var
    Color: Colors;
    Picture: MemoryPicture
    Horizontal_Index: Integer;
    Vertical_Index: Integer;
    Number: Integer;
procedure Load_Picture;
begin
;
end;
begin ( MAIN )
Load_Picture;
( The picture is now loaded into memory in the array
"Picture". Now the picture is sent to the camera. The
blue component of the picture is sent for an entire column
of the picture, then the red component of the column 4
columns "to the left" of the blue column is sent, then the
red component of the column 8 columns "to the left" of the
blue column is sent. In those cases where a column of a
particular color falls outside the bounds of the picture
array, a series of zeroes equal in length to the vertical
resolution is sent to the camera. The process of sending
the picture continues until all the information for all
the colors has been sent.
)
for Horizontal_Index = 1 to HORIZONTAL_RESOLUTION +
RED DELAY do for Color:= Blue to Red do
    case Color of
    Blue: if ( Horizontal_Index =
    HORIZONTAL_RESOLUTION )
then
    for Vertical_Index:= 1 to VERTICAL_RESOLUTION do
    write (Lst, Picture[Horizontal_Index, Vertical
Index, Color])
    else for Number:=1 to VERTICAL_RESOLUTION do
write (Lst, ZERO );
    Green:if ((Horizontal_Index - GREEN_DELAY =
HORIZONTAL_RESOLUTION)
    and ( Horizontal_Index := 1 to
    VERTICAL_RESOLUTION do
    write (Lst,Picture[Horizontal_Index-Green_Delay,
Vertical_Index, Color])
    else for Number:= 1 to VERTICAL_RESOLUTION do
    write (Lst, ZERO );
Red:if ((Horizontal_Index - Red_Delay = HORIZONTAL
RESOLUTION )
    and ( Horizontal_Index - RED _DELAY 0)) then
    for Vertical_Index := 1 to VERTICAL_RESOLUTION do
    write(Lst, Picture[Horizontal_Index-Red_Delay,
Vertical_Index, Color])
```

-continued
```
    else for Number:=1 to VERTICAL_RESOLUTION do
        write(Lst, ZERO );
    end; ( CASE )
end. ( MAIN )
```

Colored filters may be superimposed directly on the face of the CRT. Thus, even if the CRT has only white phosphor, only light having the desired color will impinge on the film. This has the effect of reducing light intensity, as much of the light produced by the CRT will be filtered. Alternatively, strips of phosphor may be used which each emit the same color as the filter which is over the phosphor strip. For example, a blue filter may be placed over blue emitting phosphor, and the light intensity loss caused by the blue filter will be much less than the loss caused by a blue filter over white phosphor.

The horizontal separations between columns 26, 27 and 28 on the screen may be equal to seven times the separation between individual pixels. The amount of separation is somewhat arbitrary; the choice of seven pixel separation distances being for illustrative purposes only. Practical consideration such as the expense of manufacturing narrow filter strips may dictate use of greater separations. If greater separations are used, larger corrections for color registration is required, rather than the exemplary 7 and 14 column corrections which are used in the embodiment of the invention described further below.

If there are 3,000 equally spaced pixels in each column, and the CRT screen is circular with the useful screen diameter of 5 inches, the pixel separation will be 5/3,000 inch, and the horizontal separation between the columns that are illuminated will be 35/3,000 inches.

The amount of exposure for a given pixel is controlled by varying the length of time during which the CRT beam having a constant current is deflected to that pixel. After completing the exposure of a pixel, the vertical deflection of the CRT beam is changed to deflect the beam to the next pixel in the column. Thus, if no exposure is needed at a particular pixel, little time is wasted because the beam is immediately deflected to the next pixel. Since full exposure is usually not needed in all three colors, and many picture regions need no exposure at all, the speed advantage is significant over conventional system.

The beam intensity is determined as explained above, and the beam current is held at the desired level to achieve that beam intensity by use of a feedback circuit, the input to which is a voltage precisely proportional to the beam current magnitude. The feedback circuit adjusts the CRT beam current control grid to cause this current to be at the desired level, providing better stability of light intensity than if the intensity is controlled by adjusting the grid voltage without sensing the beam current because the beam current. The correction can be made just prior to the illumination of each pixel column. This can be done, without closing the camera shutter, by deflecting the beam to the region of the CRT screen beneath a photodetector. Thus, the beam is on during the current adjustment, but no light reaches the lens or film. The time needed to adjust the beam current to the proper value for each color is only a few microseconds.

Figure 10:
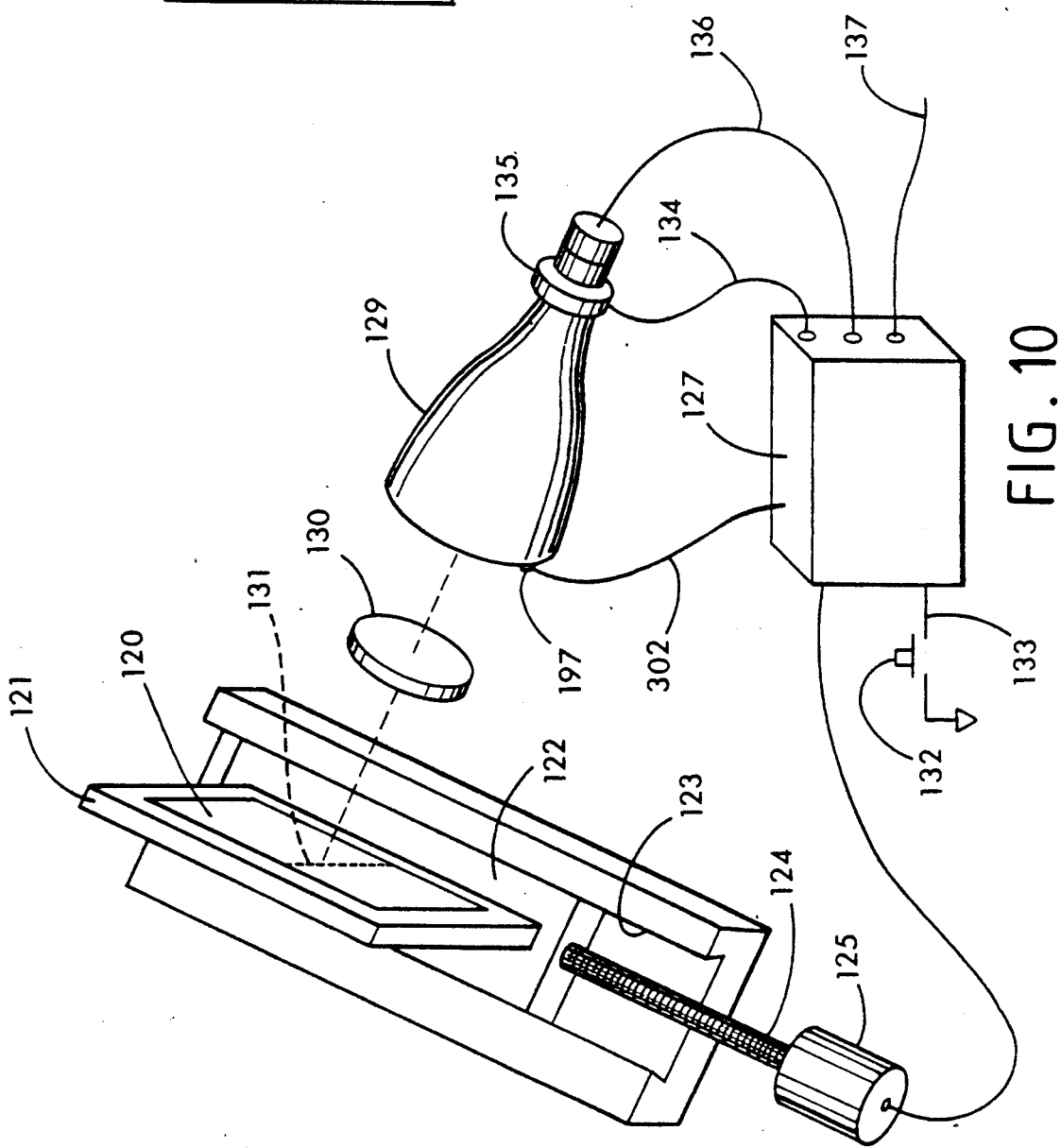
FIG. 10 is a simplified illustrative view of another embodiment of the apparatus of the invention.

The second preferred embodiment of the apparatus of the invention is shown generally in FIG. 10. This apparatus must also be operated in darkness to avoid exposing the film to light other than from the CRT. A cabinet structure to exclude light from external sources is not shown in FIG. 10, but may be easily constructed by those familiar with instruments which utilize photographic film. The frame of photographic film 120 is mounted on a film holder 121, which is attached to the slide 122 of a linear slide bearing assembly comprised of the slide 122, a bearing 123 and lead screw 124. Lead screw 124 is coupled in the conventional manner to the slide 122 and to a stepping motor 125. As lead screw 124 is rotated, the movable slide 122 is caused to move. The stepping motor 125 is controlled by a controller 127 the operation of which is described below. A lens 130, which is stationary in this embodiment, focuses the image of the display produced on the screen of the CRT 29 onto the photographic film 120. The lens 130 is positioned so that when the film 120 is at its starting position, as shown in FIG. 10, light from the blue column of pixels is imaged on a vertical line 131 located at the left edge of the film 120.

After the film 120 is advanced seven times (seven pixel widths, the exemplary CRT screen size and pixel density described above), light from the first green column of pixels on the CRT will impinge upon the first pixel column of the film 120. After fourteen advances, light from the first red column of pixels will impinge on the first pixel column of the film, completing the exposure of the first film column 131. The rest of the film columns are sequentially exposed in a similar manner.

Operation of the controller 127 is started by depressing a switch 132, which sends a command signal to the controller via a conductor 133. The controller 127 produces CRT beam deflection currents via conductors within a cable 34 to the horizontal and vertical deflection coils within a deflection coil unit 135. The controller 127 provide CRT beam on/off control signals via conductors within cable 36 to the CRT cathode and receives beam current magnitude information from the photodetector 197 via a cable 302. The controller 127 provides voltage signals to the CRT beam current intensity control electrode to cause the desired current to be produced whenever the beam is on.

The controller 127 receives color intensity information from an external graphics computer via a cable 137 in the form of e.g., 12,000,000 words, each word indicating the amount of red, green, and blue exposure desired for one of 12,000,000 pixels that make up a complete frame. The word sequence is according to the pixel order of the picture, beginning with the top pixel of the far left pixel column, and ending with the lower right pixel. In this embodiment, the controller 127 requests and receives from the computer one column of information at a time, in sequence, prior to imaging one column on film. Then another set of picture information corresponding to the next picture column is requested and received. A buffer memory within the controller 127 has the capacity to store sixteen columns of picture information, and is addressed in a manner which causes the information for a particular column and color to be provided when that column is being illuminated with that color.

Figure 11:
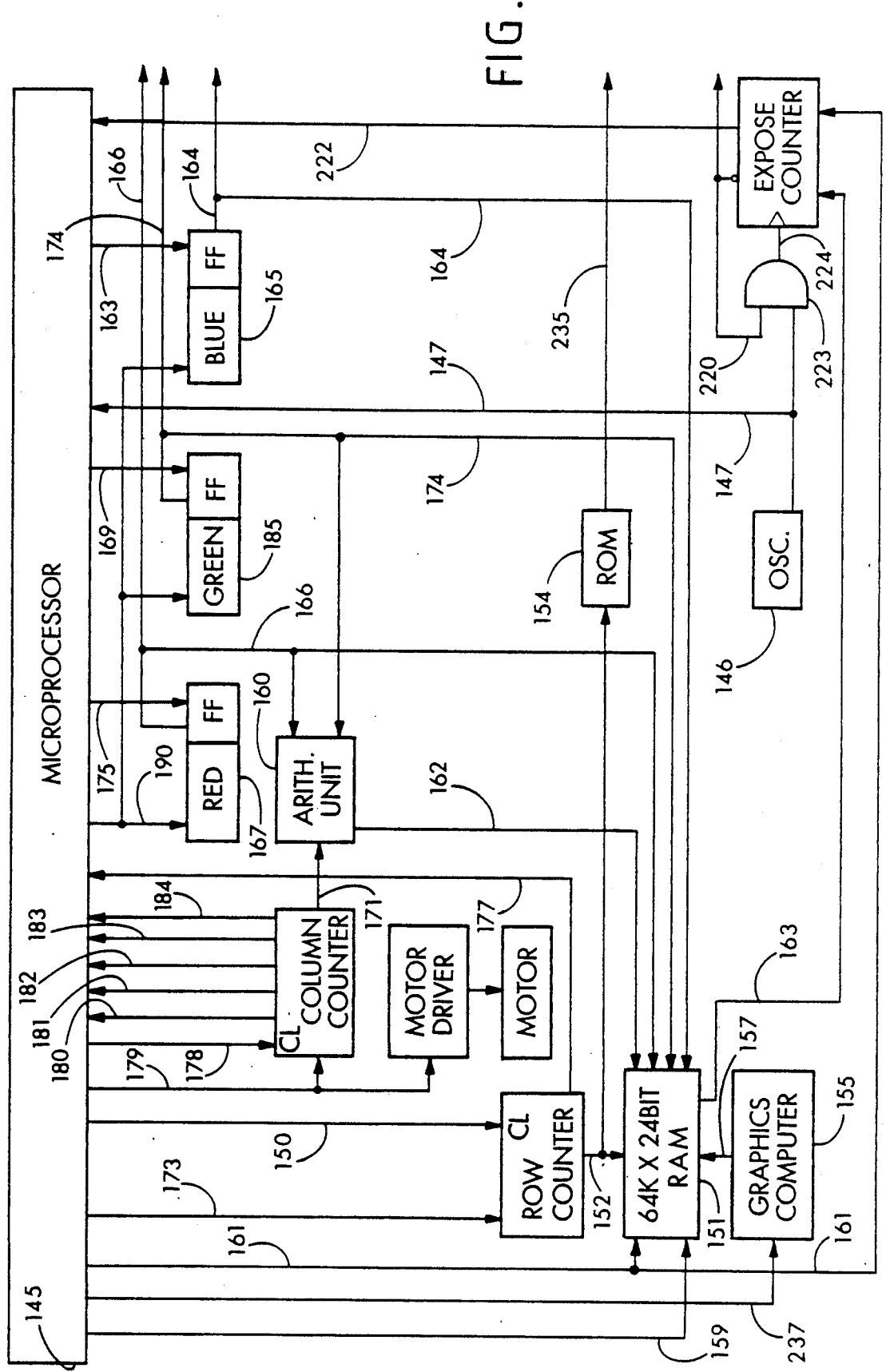
FIG. 11 is a schematic diagram of a portion of the controller for the apparatus of FIG. 10.
Figure 12:
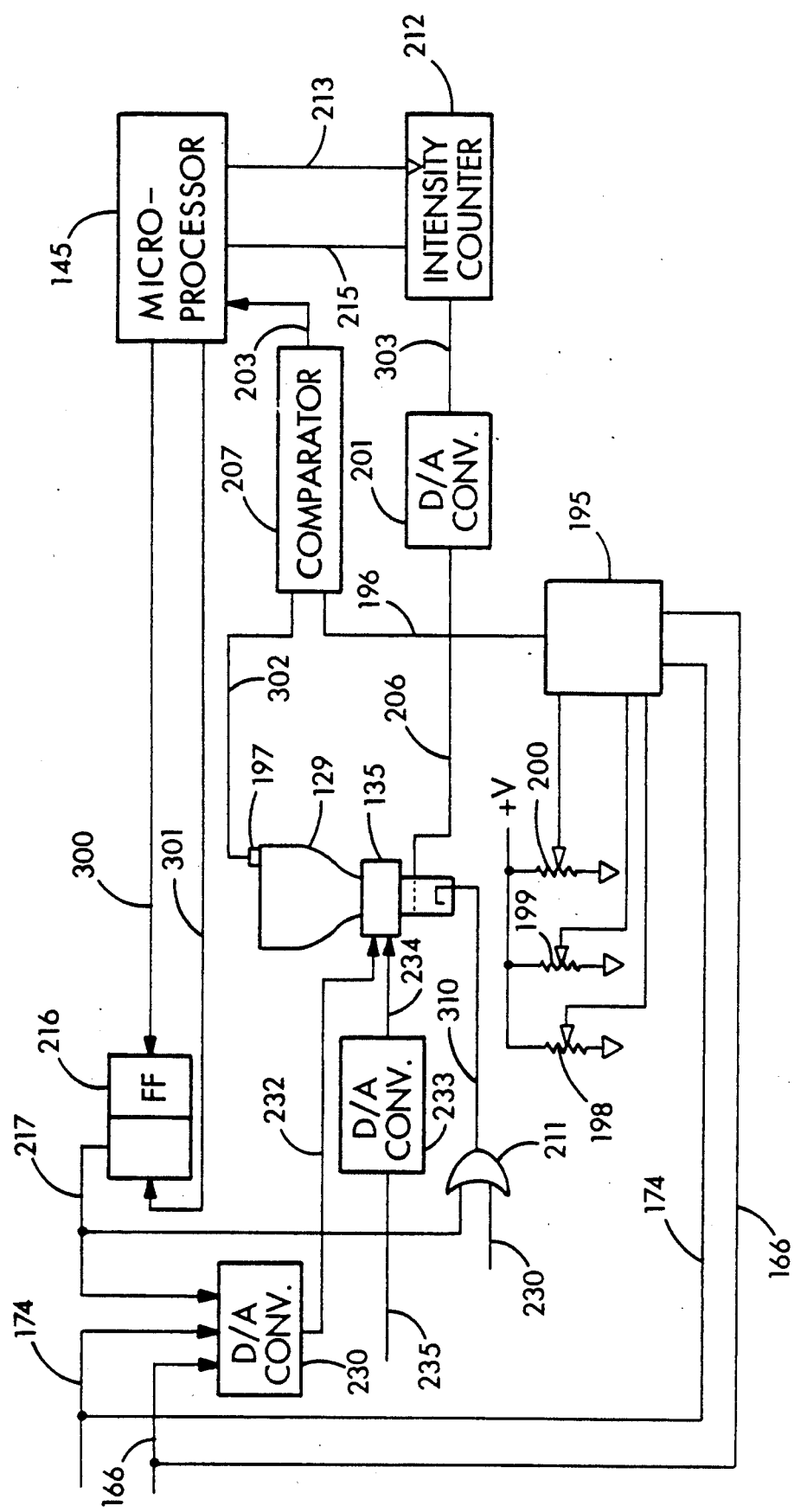
FIG. 12 is a schematic diagram of the remainder of the controller for the apparatus of FIG. 10.

FIGS. 11 & 12 are a schematic diagram of the controller 127. Referring to FIG. 11, a microprocessor 145, under control of a microprogram which has been installed in its read only memory ROM, produces a sequence of command pulses which control various counters and other circuits of the controller 127, as will be described. The microprocessor 145 receives signals which indicate the states of various counters and the output of the comparator 207, those states being the basis for various program branching or jumps, as will be indicated. Design of such microprocessors is well known.

The microprocessor 145 has a clock input received from an oscillator 146 via a conductor 147: one instruction step is executed following each of the periodic pulses provided by the oscillator. The oscillator frequency is preferably 5 megahertz in this embodiment. As well understood by those in the art, a different oscillator frequency may be selected.

The ROW COUNTER 149 is a 12 bit binary counter that provides a number corresponding to each pixel in a column; when the ROW COUNTER 149 is in state 1, the number provided is 1, and corresponds to the first pixel in the column; when the ROW COUNTER 149 is in state 3,000, the number provided is 3,000, corresponding to the 3,000th pixel in each column.

The ROW COUNTER 149 receives a signal from the microprocessor 145 via a conductor 150 which clears it to state 0. The counter receives a signal from the microprocessor 145 via a conductor 173, causing it to increment. An output signal indicating when the ROW COUNTER 149 is in state 3,000 is provided to the microprocessor 145 via conductor 177. After the the ROW COUNTER 149 reaches state 3,000, the microprocessor 145 resets it to state 0. The output of the ROW COUNTER 149 is provided to a random access MEMORY 151 and to a ROM 154 via a twelve conductor cable 152.

The MEMORY 151 is a 64K word memory, each word having a length of 24 bits. It receives information from an external computer 155 (e.g., a commercially available micro or mini computer) one word at a time via a 124 conductor cable 157. In response to Write commands received from the microprocessor 145 via a conductor 159, the MEMORY 151 writes the word presented by computer 155 into a memory address. The memory address is received from the ROW COUNTER 149, and from an ARITHMETIC UNIT 160 via a 4 conductor cable 62. All counters in this embodiment are binary counters. The MEMORY 151 provides output information to an 8 bit counter, EXPOSE COUNTER 172, via an 8 conductor cable 163. The information consists of 8 selected bits of the word stored at the address received from the ROW COUNTER 149 and the ARITHMETIC UNIT 60.

The memory output is the most significant 8 bits of the stored word if a signal is present on a conductor 164 from a BLUE FLIP-FLOP 165; the output is the least significant 8 bits of the stored word if the signal red is present on a conductor 166 from a RED FLIP-FLOP 67; otherwise the memory output is the middle 8 bits of the addressed word. The most significant 8 bits corresponds to the amount of exposure of the blue component of a pixel; the least significant 8 bits corresponds to the red exposure component; and the middle 8 bits corresponds to the green exposure component. The MEMORY 151 stores data for the columns between and including the column being illuminated with blue light and the column being illuminated with red light. While it is often possible to program the graphics computer 155 to provide data for one color at a time in such a manner as to delay the green and red data to produce the desired registration of color in the pictures, that programming is sometimes inconvenient. In such cases, it is preferred to have the registration process be part of this invention.

The COLUMN COUNTER 170, a 13 bit counter, receives a signal from the microprocessor 145 via a conductor 178 which clears it to state 0, and an incrementing signal from the microprocessor 145 via a conductor 179. The COLUMN COUNTER 170 provides output signals indicating when it has reached states 6, 13, 3,999, 4,006 and 4,013, which are conducted to the microprocessor 145 via conductors 180, 181, 182, 183, and 184, respectively. Note that the state of the COLUMN COUNTER 170 is one less than the number of columns exposed since state 0 corresponds to column one. The least significant 4 bits of the state of the COLUMN COUNTER 170 are provided via a 4 line conductor 171 to the ARITHMETIC UNIT 160.

The output of ARITHMETIC UNIT 160 is equal to the input binary number on the cable 171 whenever a "write" operation is being performed, as indicated by a write command conducted to the arithmetic unit from the microprocessor via the conductor 159, and unless there is a signal on the conductor 166 from the RED FLIP-FLOP 162 or there is a signal on conductor 174 from the GREEN FLIP-FLOP 185. If the "green" signal is positive, the output of the arithmetic unit is seven less than the four bit input signal from the COLUMN COUNTER 170. If the "red signal" is positive, the arithmetic unit output is fourteen less than the input from the COLUMN COUNTER. The output from the ARITHMETIC UNIT 160 is provided to the MEMORY 151 as the four most significant bits of the address of the information that is to be retrieved. These bits correspond to the column of pixels, with the less significant bits correspond to the pixel number in the column. This results in exposure of the proper column despite the image offsets caused by the seven column separation of each color.

Each filter and/or phosphor has a flip-flop associated with it; e.g., the RED FLIP-FLOP 167; the GREEN FLIP-FLOP 185; and the BLUE FLIP-FLOP 165. The RED, GREEN, and BLUE FLIP-FLOPS receive set signals from the the microprocessor via the conductors 175, 169 and 168. They receive a common reset signal from the microprocessor 145 via a conductor 190. The occurrence of any of the set signals for these three flip-flops is always preceded by a short reset pulse from the the microprocessor. The set signal causes one, and only one, of the three color flip-flops to be in the ON state. The flip-flops provide output signals which are positive when the flip-flop is ON, and negative when the flip-flop is OFF. The RED, GREEN and BLUE FLIP-FLOPS provide output signals to the MEMORY 151, the ARITHMETIC UNIT 160 and switches 195, 196 and 197 shown on FIG. 11, via the conductors 166, 174 and 164. As discussed above, the signals provided to the ARITHMETIC UNIT 160 insure that the proper column of information is accessed and the signals provided to the MEMORY 151 insure that the information for the proper color is accessed. The role of the switches 195, 196, and 197 is discussed below.

Referring to FIG. 12, the ANALOG SWITCH 195 is connected to variable resistors 198, 199, and 200. That switch has an output voltage equal to the voltage from one of the variable resistors, according to the states of the RED and GREEN flip-flops, those states being transmitted to ANALOG SWITCH 195 via conductors 174 and 166. If the RED FLIP-FLOP is on, the voltage output of the switch is equal to the voltage from resistor 198. If the GREEN FLIP-FLOP is on, the output of the switch is equal to the voltage from resistor 199. If neither of those flip-flops is on, the output voltage of the switch is equal to the voltage from resistor 200.

The output of ANALOG SWITCH 195 is connected to a VOLTAGE COMPARATOR 207 via a conductor 196. That comparator has a second input, from a PHOTOSENSOR 197 mounted on the screen of the CRT 129, the output of that sensor being connected to the comparator via a conductor 302. As will be explained, that sensor produces an output voltage proportional to the beam current existing during intervals in which the CRT beam is directed to the position at which the sensor is mounted on the CRT. Those intervals are intervals just prior to the exposure of each column of pixels, in any color.

The COMPARATOR 207 produces a positive output signal on conductor 203, connected from the comparator to MICROPROCESSOR 145, whenever the voltage from the PHOTOSENSOR 197 equals or exceeds the output voltage of the SWITCH 195.

The beam current of the CRT 129 is either on, or off, according to the voltage applied to its cathode electrode via conductor 310 from the output of OR GATE 211. The output of that gate is zero volts or negative input being received via conductor 207 from a FLIP-FlLOP 216, and the other input being received from EXPOSE COUNTER 172 of FIG. 11, via conductor 230. If either input is positive OR GATE 211 output is negative 20 volts. If neither input is positive, the output of the OR GATE is zero volts. The CRT beam current is zero if the OR GATE output is zero volts, and the beam current is "on" if the OR GATE output is negative 20 volts. That magnitude of the current is dependent upon the voltage existing at the CRT control grid, and as will be seen, that cathode voltage is adjusted by the adjusting the state of the INTENSITY COUNTER 212 as will be explained.

The adjustment of the state of the INTENSITY COUNTER takes place according to whether the beam current is insufficient or sufficient. The level is "insufficient" if the input to the COMPARATOR 207 from the photosensor is lower than voltage from one of the variable resistors 198, 199, or 200. If the CRT beam current is insufficient, the microprocessor causes the INTENSITY COUNTER to be incremented, thereby causing the D/A CONVERTER 201 to produce a slightly higher voltage to the CRT control grid. The incrementing process continues until the CRT beam current is sufficient, at which time the signal from the comparator to the microprocessor causes the microprocessor to cease incrementing the intensity counter.

The MICROPROCESSOR 145 produces a reset signal to an INTENSITY COUNTER 212 conducted to the counter via conductor 215, and the microprocessor also produces incrementing signals to that counter, via conductor 213.

A TEST FLIP-FLOP 216 is set to the on state by a signal from the microprocessor conducted via conductor 301, and to the off state by a signal from the microprocessor transmitted via conductor 300.

The process proceeds as follows. Prior to the exposure of a column of pixels in any color, the TEST FLIP-FLOP 216 is turned on by the signal on conductor 301 from the microprocessor. The D/A CONVERTER 230 to produce a current conducted to the horizontal deflection coil of DEFLECTION YOKE 135 via conductor 235, that deflection current being sufficient to cause the CRT beam to be directed to the PHOTOSENSOR 195 position. The OR GATE 211, which also receives the signal from the TEST FLIP-FLOP provides a negative voltage signal to the cathode of the CRT, thereby turning the beam on, and causing the photosensor to produce an output voltage. MICROPROCESSOR 145 then produces a reset signal to INTENSITY COUNTER 212, which causes the binary number presented to D/A CONVERTOR 201 to be zero. That converter produces a voltage equal to zero to the control grid of the CRT, which causes the beam current to be low, too low to cause COMPARATOR 207 to produce a positive output voltage. The microprocessor therefor produces incrementing signals until the beam current is at the desired level, after which those signals cease, and the microprocessor then produces a signal on conductor 300 to turn the TEST FLIP-FLOP to the off state, and the exposure of a column of pixels occurs as described previously.

It is to be noted that the adjustments of CRT beam current occur just prior to the exposure of any column of pixels, and it is adjusted according to the beam current desired for the particular color about to be exposed. If the exposure is to be in the blue color, the beam current will be adjusted according to the setting of resistor 200. If the exposure is to be in green color, the current will be set according to the setting of resistor 199. If the exposure is to be in red, the resistor 198 controls the beam intensity. The operator may therefore adjust the color balance as desired.

An advantage of this method of maintaining CRT beam intensities at constant levels selectable for each color is that it occurs often, thousands of times during the exposure of a picture. This is preferable to setting the current to the desired levels once, for example prior to producing the first picture to be produced, of a series of pictures, because CRT beam current drift can be significant over a period of just a few seconds, if the equipment has just been turned on and has not "warmed up" for a few minutes. The time required to increment the intensity counter as needed, about 120 microseconds, is not excessive, totalling less than 2 seconds if repeated 12,000 times as in this embodiment.

The OR gate 211 produces a positive output signal when either of its two inputs signals is positive. One of these input signals is from a TEST FLIP-FLOP 216, conducted via a conductor 217. The other input signal is connected to the output of EXPOSE COUNTER 172 of FIG. 10, via a conductor 220, this signal being negative when the EXPOSE COUNTER 172 is in state 0, and is otherwise positive. Thus, the gate 211 produces a positive output if either the TEST FLIP-FLOP 216 is on or if the EXPOSE COUNTER 172 is not in state 0. The counter 172 produces a second output signal, the complement of the signal applied to the OR gate 211. This signal is conducted to the microprocessor 145 via a conductor 222. The signal on the conductor 222 is positive when the EXPOS( COUNTER 172 is in state 0.

The EXPOSE COUNTER 172 is parallel loaded with an 8 bit number provided by the MEMORY 151 via the 8 conductor cable 163 by a read command from the microprocessor 145 applied to the MEMORY 151 and the EXPOSE COUNTER 172 on a conductor 161. The EXPOSE COUNTER 172 receives pulses from an AND gate 223 whenever the EXPOSE COUNTER 172 is not in state 0. The Gate 223 output pulses are conducted from the gate 223 to the EXPOSE COUNTER 171 via a conductor 224. The Gate 223 receives its enabling signal from the EXPOSE COUNTER 172 via conductor 220, that signal being positive when the state of the counter is non-zero. The gate receives clock pulses from the oscillator 146 via a conductor 147. Thus, when the EXPOSE COUNTER 172 is loaded with an 8 bit signal from the memory 151, it immediately produces a positive signal on the conductor 220. The signal on the line 220 remains positive until a sufficient number of decrementing signals has been received to decrement the counter to state 0. The time required for this is preferably 200N nanoseconds, where N is the magnitude of the bit which was loaded into the EXPOSE COUNTER 172. The CRT beam will therefore be turned on for a period of 200N nanoseconds, thus making the exposure on the film proportional to the magnitude of the 8 bit data signal from the MEMORY 151 provided to the EXPOSE COUNTER 172.

A digital-to-analog converter 230 provides a current to the horizontal deflection coils of deflection yoke 231 via a conductor 232. These currents are sufficient to deflect the CRT beam, as will be described. The converter 230 receives RED, GREEN and TEST FLIP-FLOP output signals via conductors 166, 174 and 217. The converter output is proportional to the 3 bit digital input where the "green" signal is the least significant bit, the "test" signal is the most significant bit, and the "red" signal is the other bit. When only the RED FLIP-FLOP 167 has a positive output signal, the digital-to-analog converter 230 has an input of 010 and provides an output current that deflects the CRT beam fourteen column positions to the left of the blue pixel column. When only the GREEN FLIP-FLOP 185 has a positive output signal, the converter 230 has an input of 001 and provides an output current that deflects the CRT beam seven columns to the left of the blue pixel column. When the TEST FLIP-FLOP 216 has a positive output signal, the digital-to-analog converter 230 has an input of 100, 101, or 110 and provides sufficient current to deflect the beam to the region of the CRT face under the photosensor 197.

The vertical deflection coils of the deflection yoke 135 receive current from a 16 bit digital-to-analog converter 233 via a conductor 234. The current is proportional in magnitude to the magnitude of a 16 bit binary number provided to the converter 233 from the ROM 154 via a conductor cable 235. The ROM 154 receives a 12 bit input from the ROW COUNTER 149, via a twelve conductor cable 152. The ROM 154 serves as a look up table containing, for each of the 3,000 possible states of the ROW COUNTER 149, output numbers of sufficient magnitude to provide correct vertical deflection, despite non-linearities. The values of the 16 bit numbers written into the ROM 154 may be calculated or measured. 16 bit numbers are used to avoid round off or truncating effects which otherwise may cause gaps or overlapping of successive pixels on the screen.

The microprocessor 145 produces a fetch signal to the external graphics computer 155, transmitted via a conductor 237. The computer is programmed in a conventional manner so that it responds to each such fetch signal by providing a 24 bit serial word pixel exposure control to the MEMORY 151 in sequence from the top pixel of the left hand column of the picture, through all pixels of that column. The process is repeated column by column thereafter until the bottom pixel of the 4,000th column is reached.

The operation of the controller will now be summarized. Before any column is illuminated, the test procedure is performed to insure that the beam current is at the desired level. To start the test procedure all flip-flops and the INTENSITY COUNTER 212 are reset. The TEST FLIP-FLOP 216 and the flip-flop corresponding to the next color exposure are then set. This causes the OR gate 211 to turn on the switch 205 and provide current to the CRT grid. The DAC 230 also receives the output of the TEST FLIP-FLOP 216 and provides a current to the horizontal deflection coils causing the CRT beam to be deflected to the phosphor at the region of the CRT face under the photosensor 197. The beam intensity voltage E(b) is measured by the photosensor and compared to the selected voltage from the resistor 200 by the comparator 207. If E(b) is less than zero, the INTENSITY COUNTER 212 is incremented. When E(b) reaches the voltage from the resistor 200, the test procedure ends and the TEST FLIP-FLOP 216 is reset. The appropriate color flip-flop remains set. Following the test procedure a column of pixels is illuminated. The microprocessor 145 then sends a fetch signal to the computer 155 which provides the data for the first column to the MEMORY 151, and the computer 155 provides 3,000 twenty four bit words to addresses provided by the ROW COUNTER 149 and the ARITHMETIC UNIT 160.

The COLUMN COUNTER 170 then provides 0000 to the ARITMETIC UNIT 160. Since the "green" and "red" inputs to the ARITHMETIC UNIT 160 are ZERO, the number provided to the MEMORY 151 is 0000. Thus the first "column" of information in the MEMORY 151 will be retrieved. The ROW COUNTER 149 has a state of 000 000 000 001 and provides this to the MEMORY 151 and the ROM 154. The entire address is 0000 000 000 001. The MEMORY 151 also receives the "blue" signal as an input from the BLUE FLIP FLOP 165. As a result, the first 8 bits of the 24 bit word corresponding to the first pixel of the first column is retrieved and provided to the EXPOSE COUNTER 172. This causes the output of the EXPOSE COUNTER 172 on line 220 to change to ONE. The OR GATE 211 in turn turns on the beam current by causing the cathode to be at negative 20 volts. The DAC 201 receives as an input a signal based on the feedback provided to the microprocessor 145 from the COMPARATOR 207.

The ROM 154 receives the output of the ROW COUNTER 149 as an input and provides a control signal output to the vertical deflection coils of the yoke 135 through the DAC 233. This deflects the beam to the first pixel position. The output of the DAC 230 deflects the CRT beam to the "blue" pixel column since the "red", "green" and "test" signals are zero.

The SWITCH 197 is turned on by the "blue" signal, causing a voltage to be provided to the CRT cathode. The CRT cathode remains at negative 20 volts while the EXPOSE COUNTER 172 counts down to state zero. When state zero is reached, the OR gate turns off, causing the cathode voltage to become positively thereby turning off the CRT beam current. The signal on the conductor 222 becomes ONE when the EXPOSE COUNTER 172 reaches state zero.

Upon receiving a ONE from the EXPOSE COUNTER 172, the microprocessor 145 causes the ROW COUNTER 149 to be incremented to 000 000 000 010. A new 8 bits (the first 8 bits of the second word) is provided to the ROM 154 and to the EXPOSE COUNTER 172. This results in the beam being deflected to the second pixel and the beam being turned on for an appropriate length of time. The process is repeated until the ROW COUNTER 149 reaches state 3,000 (101 110 111 000).

After the 3,000th pixel is illuminated (and the ROW COUNTER 149 is in state 3,000) the ROW COUNTER 149 sends a signal to the microprocessor 145. In response to this signal, the COLUMN COUNTER 170 is incremented, and the test procedure is performed, the ROW COUNTER 144 is reset, the motor driver is turned on to advance the film one column, and a new column of information is received from the computer 155.

The entire process is repeated for the first seven columns. When the COLUMN COUNTER 170 reaches state 6 (7 columns have been exposed), a signal is provided to the microprocessor 145 which causes a jump to a second sub-routine. The program jumps to the second sub-routine, which increments the COLUMN COUNTER 170, advances the film, and exposes column 8 with blue light in the same manner as the previous sub-routine exposed columns 1–7. However, after column 8 has been exposed by blue light the film is not advanced and the COLUMN COUNTER 170 is not incremented. The test procedure is performed and the ROW COUNTER 149 is reset. Note that the GREEN FLIP-FLOP 185 was on during the test procedure and remains on for the green exposure. The test procedure causes the beam intensity to be set according to the voltage from the variable resistor 199. This then causes the ARITHMETIC UNIT 160 to provide an output of 0111−0111=0000. As a result, the first column of data is retrieved by the MEMORY 151, and the "green" input causes the middle bits of the first word in the first column to be retrieved by the MEMORY 151. The output of the MEMORY 151 is provided to the EXPOSE COUNTER 172 in the same manner as was the "blue" data. The ROM 154, the DAC 233, the SWITCH 205, and the DAC 201 all are controlled as they were for blue illumination. The GREEN FLIP-FLOP 185 causes the switch 196 to provide a voltage to the comparator corresponding to the voltage from the resistor 199. The DAC 230 receives a "green" signal and causes the CRT beam to be horizontally deflected to the green pixel column.

After completing exposure of the first column with green light, the COLUMN COUNTER 170 is incremeted, the film is advanced, the test procedure is performed, the ROW COUNTER 149 is reset, and a new column of information is received from computer 155. Then column 9 is exposed pixel by pixel with blue light, and column 2 with green light. This continues until the COLUMN COUNTER 170 reaches state 13. A signal is then provided to the microprocessor 145 that causes a jump to a third sub-routine.

The third sub-routine causes column 15 to be exposed in blue light and column 8 to be exposed in green light. After the green exposure is completed, the flip-flops are reset, the test procedure is performed, and the ROW COUNTER 149 is reset. Then the first column is exposed with red light. The output of the ARITHMETIC UNIT 160 is 1110−1110=0000. This, in combination with the "red" input to the MEMORY 151 causes the last 8 bits of the first word in the first column to be retrieved. The RED FLIP-FLOP 167 also causes the DAC 230 to deflect the CRT beam to the red region. The ROM 154, the EXPOSE COUNTER 172, the DAC 233, and the SWITCH 205 are controlled in the same manner as described above. Each pixel in the first column is then exposed with red light. After exposure of the first column with red light, the COLUMN COUNTER 170 is incremented, the film is advanced, the test procedure is performed, the ROW COUNTER 149 is reset, all flip-flops are reset, and a new column of information is retrieved and written to the address provided by the COLUMN COUNTER 170. Then the sub-routine is repeated and columns 16, 9, and 2 are exposed. This process is repeated until the COLUMN COUNTER 170 reaches state 4,000.

It is worth noting that when the data for column 17 is received, the last four bits of the COLUMN COUNTER 170 output is 0000. This results in the incoming data from the computer being written over the data for the first column, which is permissible since the first column data has already been used.

When the COLUMN COUNTER 170 reaches state 3,999, a signal is provided to the microprocessor 145 which causes a jump to a fourth sub-routine. In this sub-routine only green and red exposures are performed (similar to the second sub-routine where only blue and red were illuminated) and no new data is retrieved. This sub-routine is repeated until the COLUMN COUNTER 170 reaches state 4,006, which causes a jump to a fifth sub-routine.

The fifth sub-routine causes exposures to be made in red only (similar to the first 7 columns) until the COLUMN COUNTER 170 reaches state 4,013, which causes the process to end.

While the foregoing embodiment preferably operates as indicated above, it should be realized that there are variations which also may be utilized, without changing the basic principals involved. For example, instead of moving the film, with the lens and the CRT stationary, the lens could be moved while the film and the CRT remain stationary, and the lens and CRT can be moved while the film remains stationary.

It may be practical to utilize a single column of pixels on the screen, with movable color filters located near the CRT face, instead of utilizing 3 phosphor strips and/or fixed filters. The filters may be narrow strips of low mass, needing only small movements which could be very rapid. In this case color re-registration would not be necessary, but the advantages of very high geometric accuracies would be retained, and other advantages such as those gained by varying the exposure by changing time of exposure would be retained.

It is understood that the invention is not confined to the embodiments set forth herein, but embraces all such modified forms thereof as come within the scope of the following claims.

What is claimed is:

1. Graphics color film recording apparatus comprising:
    (a) film carrier means for supporting a frame of photographic film;
    (b) means for emitting light in at least two parallel spaced strips, each strip emitting in a different color, the light being emitted from each strip in discrete pixels, wherein the means for emitting light includes a cathode ray tube and at least three strips of phosphor formed on the face of the cathode ray tube, each strip of phosphor emitting a separate primary color when impinged by the electron beam of the cathode ray tube;
    (c) means for focusing the light emitted from the means for emitting light onto a film frame supported by the film carrier means;
    (d) means for selectively providing relative movement between the film carrier means, the means for emitting light and the means for focusing the light to selectively change the relative position at which the light emitted from the means for emitting light is focused on the frame of film held by the film carrier means; and
    (e) control means for controlling the relative movement between the film carrier means and the means for emitting light and the focusing means, and for controlling the means for emitting light to control the pattern of light emitted in the pixels in each of the strips in correspondence with the position on the film frame at which the light emitted from the strips is focused, wherein the control means includes a buffer memory for storing data words corresponding to a plurality of adjacent columns of pixels to be exposed on the film frame, the number of columns stored equal at least to the number of columns separating the columns of pixels to be exposed on the photographic film at any one position of the film, the data word for each pixel stored at each memory address including data for pixel intensity in each of the three primary colors.

2. The apparatus of claim 1 wherein the means for emitting light includes a cathode ray tube and at least three strips of phosphor formed on the face of the cathode ray tube, each strip of phosphor emitting a separate primary color when impinged by the electron beam of the cathode ray tube.

3. The apparatus of claim 2 further including filters mounted on the face of the cathode ray tube over the three strips of phosphor, each filter passing substantially the color of light which is emitted by the phosphor strip underneath the filter and blocking other colors of light.

4. The apparatus of claim 1 wherein the means for emitting light comprises a cathode ray tube having a face coated with a phosphor which emits a broad spectrum of light, and wherein the three spaced light emitting strips are defined by three strips of filter material mounted to the face of the cathode ray tube, each filter passing substantially only one primary color.

5. The apparatus of claim 1 wherein the means for emitting light are emits red, green and blue light from three spaced strips.

6. Graphics color film recording apparatus comprising:
    (a) film carrier means for supporting a frame of photographic film;
    (b) means for emitting light in at least two parallel spaced strips, each strip emitting in a different color, the light being emitted from each strip in discrete pixels;
    (c) means for focusing the light emitting from the means for emitting light onto a film frame supported by the film carrier means;
    (d) means for selectively providing relative movement between the film carrier means, the means for emitting light and the means for focusing the light to selectively change the relative position at which the light emitted from the means for emitting light is focused on the frame of film held by the film carrier means; and
    (e) control means for controlling the relative movement between the film carrier means and the means for emitting light and the focusing means, and for controlling the means for emitting light to control the pattern of light emitted in the pixels in each of the strips in correspondence with the position on the film frame at which the light emitted from the strips is focused, wherein the means for providing relative movement includes a slide mounted in a slide bearing to provide selective lateral movement of the slide in a straight line, the film carrier means mounted on the slide member, and means for selectively indexing the slide back and forth in desired increments.

7. The apparatus of claim 6 wherein the means for selectively indexing the slide member includes a drive screw connected to the slide and a stepping motor connected to the drive screw to turn the drive screw into the slide to move the slide a selective amount for each step of the stepping motor.

8. Graphics color film recording apparatus comprising:
  (a) film carrier means for supporting a frame of photographic film;
  (b) means for emitting light in at least two parallel spaced strips, each strip emitting in a different color, the light being emitted from each strip in discrete pixels wherein the means for emitting light includes a cathode ray tube and at least three strips of phosphor formed on the face of the cathode ray tube, each strip of phosphor emitting a separate primary color when impinged by the electron beam of the cathode ray tube;
  (c) means for focusing the light emitted from the means for emitting light onto a film frame supported by the film carrier means;
  (d) means for selectively providing relative movement between the film carrier means, the means for emitting light and the means for focusing the light to selectively change the relative position at which the light emitted from the means for emitting light is focused on the frame of film held by the film carrier means; and
  (e) control means for controlling the relative movement between the film carrier means and the means for emitting light and the focusing means, and for controlling the means for emitting light to control the pattern of light emitted in the pixels in each of the strips in correspondence with the position on the film frame at which the light emitted from the strips is focused, wherein the control means causes the electron beam to dwell at each pixel on the three light emitting strips of phosphor in proportion to the desired intensity of the color of that phosphor at the corresponding pixel focused on the film frame.

9. Graphics color film recording apparatus comprising:
  (a) film carrier means for supporting a frame of photographic film;
  (b) means for emitting light in at least two parallel spaced strips, each strip emitting in a different color, the light being emitted from each strip in discrete pixels wherein the means for emitting light includes a cathode ray tube and at least three strips of phosphor formed on the face of the cathode ray tube, each strip of phosphor emitting a separate primary color when impinged by the electron beam of the cathode ray tube;
  (c) means for focusing the light emitted from the means for emitting light onto a film frame supported by the film carrier means;
  (d) means for selectively providing relative movement between the film carrier means, the means for emitting light and the means for focusing the light to selectively change the relative position at which the light emitted from the means for emitting light is focused on the frame of film held by the film carrier means; and
  (e) control means for controlling the relative movement between the film carrier means and the means for emitting light and the focusing means, and for controlling the means for emitting light to control the pattern of light emitted in the pixels in each of the strips in correspondence with the position on the film frame at which the light emitted from the strips is focused, wherein the control means causes the electron beam to dwell at each pixel on the three light emitting strips of phosphor in proportion to the desired intensity of the color of that phosphor at the corresponding pixel focused on the film frame;
  further including means for measuring the electron beam intensity and providing such measurement to the control means, wherein the control means uses the measured intensity to control the electron beam intensity of the cathode ray tube to a selected level.

10. Graphics color film recording apparatus comprising:
  (a) a cathode ray tube including means for deflecting the beam of the cathode ray tube in response to control signals, the cathode ray tube having a face plate with phosphors thereon to provide at least three parallel light emitting strips on the face of the cathode ray tube such that light is provided from the face of the tube in a first primary color when a first of the adjacent strips is activated by the cathode ray tube beam, in a second primary color when a second of the strips is activated, and a third primary color when a third of these strips is activated;
  (b) means for supporting a frame of film and controllably displacing the film frame laterally in selected increments in response to a control signal;
  (c) means for focusing light emitted from the cathode ray tube face to a position traversable by a film frame held by the means for supporting and displacing the film frame; and
  (d) control means connected to the cathode ray tube and to the means for supporting the displacing the film frame to provide control signals thereto, for coordinating the display of a line of light formed of pixels on the cathode ray tube face in each of the primary colors to a single line of exposure positioned on the film frame, and indexing the film frame to a new position corresponding to a new line activated on the cathode ray tube face and to make a new exposure of the film at that position from the activated pixels of the three strips on the CRT face, and to repeat the process until an entire desired image is exposed on the film frame, wherein the control means includes timer means for producing a cathode ray tube electron beam on/off signal for a length of time proportional to the magnitude of the data corresponding to the intensity for a pixel to be exposed, horizontal deflection counter means operatively connected to the cathode ray tube to count the number of pixels that have been exposed and to control the cathode ray tube to shift the electron beam successively from one of the phosphor strips to the next phosphor strip, thence to the next phosphor strip and thence back to the first strip in repetition after each pixel has been exposed, and vertical deflection counter means for counting the number of pixels that have been exposed in a column and providing an output signal when all of the pixels in a column have been exposed, and further including means for controlling the selective displacement means to shift the position of a film frame held by the film carrier one pixel width after the vertical deflection counter means has counted up to the full number of pixels in a column.

11. Graphics color film recording apparatus comprising:
 (a) a cathode ray tube with three separate strips of phosphor extending parallel to one another substantially across the full diameter of the face of the cathode ray tube, each strip of phosphor being separately traceable by the electron beam of the cathode ray tube to emit in a separate primary color;
 (b) a film carrier for holding a frame of photographic film to be exposed in a desired position with respect to the cathode ray tube; and
 (c) means for focusing the light emitted from the three phosphor strips on the cathode ray tube onto three separated strips each one pixel wide on a frame of film held by the film carrier;
 (d) means for controllably displacing the film carrier and the film frame therein laterally in selected increments in response to a control signal; and
 (e) control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier, wherein the control means includes timer means for producing a cathode ray tube electron beam on/off signal for a length of time proportional to the magnitude of the data corresponding to the intensity for a pixel to be exposed, horizontal deflection counter means operatively connected to the cathode ray tube to count the number of pixels that have been exposed and to control the cathode ray tube to shift the electron beam successively from one of the phosphor strips to the next phosphor strip, thence to the next phosphor strip and thence back to the first strip in repetition after each pixel has been exposed, and vertical deflection counter means for counting the number of pixels that have been exposed in a column and providing an output signal when all of the pixels in a column have been exposed, and further including means for controlling the selective displacement means to shift the position of a film frame held by the film carrier one pixel width after the vertical deflection counter means has counted up the full number of pixels in a column.

12. Graphics color film recording apparatus comprising:
 (a) a cathode ray tube with three separate strips of phosphor extending parallel to one another substantially across the full diameter of the face of the cathode ray tube, each strip of phosphor being separately traceable by the electron beam of the cathode ray tube to emit in a separate primary color;
 (b) a film carrier for holding a frame of photographic film to be exposed in a desired position with respect to the cathode ray tube; and
 (c) means for focusing the light emitted from the three phosphor strips on the cathode ray tube onto a single strip one pixel wide on a frame of film held by the film carrier;
 (d) means for controllably displacing the film carrier and the film frame therein laterally in selected increments in response to a control signal; and
 (e) control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier, wherein the control means includes timer means for producing a cathode ray tube electron beam on/off signal for a length of time proportional to the magnitude of the data corresponding to the intensity for a pixel to be exposed, horizontal deflection counter means operatively connected to the cathode ray tube to count the number of pixels that have been exposed and to control the cathode ray tube to shift the electron beam successively from one of the phosphor strips to the next phosphor strip, thence to the next phosphor strip and thence back to the first strip in repetition after each pixel has been exposed, and vertical deflection counter means for counting the number of pixels that have been exposed in a column and providing an output signal when all of the pixels in a column have been exposed, and further including means for controlling the selective displacement means to shift the position of a film frame held by the film carrier one pixel width after the vertical deflection counter means has counted up to the full number of pixels in a column.

13. The apparatus of claim 10, 11 or 12 wherein the phosphor strips emit in the three primary colors of red, green and blue.

14. The apparatus of claim 11 or 12 including control means for controlling the tracing of the electron beam onto the cathode ray tube and the position of the film carrier to coordinate the image drawn on the three strips on the cathode ray tube with the desired image of those lines on the film frame held by the film carrier.

15. The apparatus of claim 14 wherein the control means causes the electron beam of the cathode ray tube to dwell at each pixel on each of the three strips for a time proportional to the desired brightness of that pixel in that color on the exposed frame of film.

16. Graphics color film recording apparatus comprising:
 (a) a cathode ray tube with three separate strips of phosphor extending parallel to one another substantially across the full diameter of the face of the cathode ray tube, each strip of phosphor being separately traceable by the electron beam of the cathode ray tube to emit in a separate primary color;

(b) a film carrier for holding a frame of photographic film to be exposed in a desired position with respect to the cathode ray tube; and (c) means for focusing the light emitted from the three phosphor strips on the cathode ray tube onto a single strip one pixel wide on a frame of film held by the film carrier, wherein the means for focusing the light includes beam splitters aligned over the three phosphors on the face of the cathode ray tube and arranged to partially reflect and partially transmit the light from the strips so that the light from one end strip is completely reflected to one side, the light from the second strip is partially reflected to one side and combined with the light from the first strip, and the light from the third strip is partially reflected to one side and is combined with the light from the first and second strips.

17. The apparatus of claim 10, 11 or 12 further including color filters positioned on the cathode ray tube face, each filter lying over one of the strips of phosphor and passing colors substantially corresponding to the colors emitted by the phosphor under each such filter.

18. The apparatus of claim 11 including means for controllably displacing the film carrier and the film frame therein laterally in selected increments in response to a control signal, and control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier.

19. The apparatus of claim 12 including means for controllably displacing the film carrier and the film frame therein laterally in selected increments in response to a control signal, and control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier.

20. Graphics color film recording apparatus comprising:

(a) film carrier means for supporting a frame of photographic film;

(b) means for emitting light in at least two parallel spaced strips, each strip emitting in a different color, the light being emitted from each strip in discrete pixels, wherein the means for emitting light includes a cathode ray tube and at least three strips of phosphor formed on the face of the cathode ray tube, each strip of phosphor emitting a separate primary color when impinged by the electron beam of the cathode ray tube;

(c) means for focusing the light emitted from the means for emitting light onto a film frame supported by the film carrier means;

(d) means for selectively providing relative movement between the film carrier means, the means for emitting light and the means for focusing the light to selectively change the relative position at which the light emitted from the means for emitting light is focused on the frame of film held by the film carrier means; and (e) control means for controlling the relative movement between the film carrier means and the means for emitting light and the focusing means, and for controlling the means for emitting light to control the pattern of light emitted in the pixels in each of the strips in correspondence with the position on the film frame at which the light emitted from the strips is focused wherein the control means includes timer means for producing a cathode ray tube electron beam on/off signal for a length of time proportional to the magnitude of the data corresponding to the intensity for a pixel to be exposed, horizontal deflection counter means operatively connected to the cathode ray tube to count the number of pixels that have been exposed and to control the cathode ray tube to shift the electron beam successively from one of the phosphor strips to the next phosphor strip, thence to the next phosphor strip and thence back to the first strip in repetition after each pixel has been exposed, and vertical deflection counter means for counting the number of pixels that have been exposed in a column and providing an output signal when all of the pixels in a column have been exposed, and further including means for controlling the selective displacement means to shift the position of a film frame held by the film carrier one pixel width after the vertical deflection counter means has counted up to the full number of pixels in a column.

21. Graphics color film recording apparatus comprising:

(a) a cathode ray tube including means for deflecting the beam of the cathode ray tube in response to control signals, the cathode ray tube having a face plate with phosphors thereon to provide at least three parallel light emitting strips on the face of the cathode ray tube such that light is provided from the face of the tube in a first primary color when a first of the adjacent strips is activated by the cathode ray tube beam, in a second primary color when a second of the strips is activated, and a third primary color when a third of these strips is activated;

(b) means for supporting a frame of film and controllably displacing the film frame laterally in selected increments in response to a control signal;

(c) means for focusing light emitted from the cathode ray tube face to a position transversable by a film frame held by the means for supporting and displacing the film frame; and (d) control means connected to the cathode ray tube and to the means for supporting and displacing the film frame to provide control signals thereto, for coordinating the display of a line of light formed of pixels on the cathode ray tube face in each of the primary colors to a single line of exposure positioned on the film frame, and indexing the film frame to a new position corresponding to a new line activated on the cathode ray tube face and to make a new exposure of the film at that position from the activated pixels of the three strips on the CRT face, and to repeat the process until an entire desired image is exposed on the film frame, wherein the control means includes a buffer memory for storing data words corresponding to a plurality of adjacent columns of pixels to be exposed on the film frame, the number of columns stored equal at least to the number of columns separating the columns of pixels to be exposed on the photographic film at any one position of the film, the data word for each pixel stored at each memory address including data for pixel intensity in each of the three primary colors.

22. A method for recording a computer generated two dimensional graphics image on color film, comprising the steps of:
 (a) generating a first line of pixels in a first color on a cathode ray tube screen which corresponds to the desired intensity of the pixels of that color in one line of a two dimensional graphic image, and focusing the first line of pixels onto a line on a frame of film to expose the film in that line;
 (b) generating a second line of pixels on the cathode ray tube screen in a second color, the second line of pixels composed of the desired intensity of the second color in each pixel for the same line of the graphics image as the first line formed on the cathode ray tube screen, and focusing the second line of pixels onto the position on the film frame at which the first line of pixels was focused to expose the film in the second color;
 (c) generating a third line of pixels in a third color on the cathode ray tube screen, the third line of pixels composed of the desired intensity of the second color in each pixel for the same line of the graphics image as the first and second lines of pixels formed on the cathode ray tube screen, and focusing the third line of pixels on to the film frame at the same position at which the first and second line of pixels were focused to expose the film frame at that line in the third color, the first, second and third lines of pixels being generated as three separate and spaced lines on the cathode ray tube screen, wherein the first line, the second line, and the third line generated on the cathode ray tube screen are focused at three different positions in space, and after the first line is focused on the film, the film is moved so that the exposed line on the film is located at the position at which the second line generated on the cathode ray tube will be focused, after which the second line is generated and focused on the film to expose the film in the second color, and thereafter the film is moved again so that the exposed line will be at the position at which the third line generated on the cathode ray tube screen will be focused, after which the third line is generated and focused on the film to expose the line on the film in the third color.

23. The method of claim 22 wherein the colors of the first, second and third lines generated on the cathode ray tube screen are red, green and blue.

24. Graphics color film recording apparatus comprising:
 (a) a cathode ray tube with three separate strips of phosphor extending parallel to one another substantially across the full diameter of the face of the cathode ray tube, each strip of phosphor being separately traceable by the electron beam of the cathode ray tube to emit in a separate primary color;
 (b) a film carrier for holding a frame of photographic film to be exposed in a desired position with respect to the cathode ray tube;
 (c) means for focusing the light emitted from the three phosphor strips on the cathode ray tube onto three separated strips each one pixel wide on a frame of film held by the film carrier;
 (d) means for controllably displacing the film carrier and the film frame therein laterally in selected increments in response to a control signal; and
 (e) control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier, wherein the control means includes a buffer memory for storing data words corresponding to a plurality of adjacent columns of pixels to be exposed on the film frame, the number of columns stored equal at least to the number of columns separating the columns of pixels to be exposed on the photographic film at any one position of the film, the data word for each pixel stored at each memory address including data for pixel intensity in each of the three primary colors.

25. Graphics color film recording apparatus comprising:
 (a) a cathode ray tube with three separate strips of phosphor extending parallel to one another substantially across the full diameter of the face of the cathode ray tube, each strip of phosphor being separately traceable by the electron beam of the cathode ray tube to emit in a separate primary color;
 (b) a film carrier for holding a frame of photographic film to be exposed in a desired position with respect to the cathode ray tube;
 (c) means for focusing the light emitted from the three phosphor strips on the cathode ray tube onto a single strip one pixel wide on a frame of film held by the film carrier;
 (d) means for controllably displacing the film carrier and the film frame therein laterally in selected increments in response to a control signal; and
 (e) control means for controlling the tracing of the electron beam onto the cathode ray tube and for controlling the means for controllably displacing the carrier and film frame to position the film carrier to coordinate the image drawn on the three strips on the cathode ray tube with the desired image of those lines on the film frame held by the film carrier, wherein the control means includes a buffer memory for storing data words corresponding to a plurality of adjacent columns of pixels to be exposed on the film frame, the number of columns stored equal at least to the number of columns separating the columns of pixels to be exposed on the photographic film at any one position of the film, the data word for each pixel stored at each memory address including data for pixel intensity in each of the three primary colors.

26. Graphics color film recording apparatus comprising:
 (a) film carrier means for supporting a frame of photographic film;
 (b) means for emitting light in discrete pixels in at least two different colors;
 (c) means for focusing the light emitted from the means for emitting light onto a film frame supported by the film carrier means;
 (d) means for selectively providing relative movement between the film carrier means, the means for emitting light and the means for focusing the light to selectively change the relative position at which the light emitted from the means for emitting light is focused on the frame of film held by the film carrier means, the means for providing relative movement including a slide mounted in a slide bearing to provide selective lateral movement of the slide in a straight line, the film carrier means mounted on the slide member, and means for selectively indexing the slide back and forth in desired increments; and (e) control means for controlling the relative movement between the film carrier means and the means for emitting light and the focusing means, and for controlling the means for emitting light to control the pattern of light emitted in the pixels in correspondence with the position on the film frame at which the light emitted is focused.

27. The apparatus of claim 26 wherein the means for selectively indexing the slide member includes a drive screw connected to the slide and a stepping motor connected to the drive screw to turn the drive screw into the slide to move the slide a selective amount for each step of the stepping motor.

28. The apparatus of claim 1, 21, 24 or 25 including an exposure counter operatively connected to the cathode ray tube to cause the electron beam of the cathode ray tube to dwell at a pixel for a period of time proportional to the data word loaded into the exposure counter means, the exposure counter means receiving a portion of the data word for the pixel stored at the memory address which corresponds to the intensity of the color of the pixel to be exposed.

* * * * *